US012518646B1

(12) United States Patent
Lambert

(10) Patent No.: US 12,518,646 B1
(45) Date of Patent: Jan. 6, 2026

(54) ACCESSIBLE e-LEARNING SYSTEMS AND METHODS

(71) Applicant: The Ontario Educational Communications Authority (TVO), Toronto (CA)

(72) Inventor: Owen Lambert, Toronto (CA)

(73) Assignee: THE ONTARIO EDUCATIONAL COMMUNICATIONS AUTHORITY (TVO), Toronto (CA)

( * ) Notice: Subject to any disclaimer, the term of this patent is extended or adjusted under 35 U.S.C. 154(b) by 0 days.

(21) Appl. No.: 18/512,942

(22) Filed: Nov. 17, 2023

(51) Int. Cl.
G09B 5/02 (2006.01)

(52) U.S. Cl.
CPC ..................... G09B 5/02 (2013.01)

(58) Field of Classification Search
CPC ....................................................... G09B 5/02
See application file for complete search history.

(56) References Cited

U.S. PATENT DOCUMENTS

| | | | |
|---|---|---|---|
| 7,949,681 B2 | 5/2011 | Bodin et al. | |
| 7,996,754 B2 | 8/2011 | Bodin et al. | |
| 9,703,781 B2 | 7/2017 | Hwang et al. | |
| 11,748,396 B2 * | 9/2023 | Mihai | G09B 5/00 |
| | | | 707/803 |
| 2005/0097169 A1 * | 5/2005 | Mukherjee | H04L 65/765 |
| | | | 709/204 |
| 2007/0192683 A1 * | 8/2007 | Bodin | G06F 16/258 |
| | | | 707/E17.121 |
| 2013/0130221 A1 | 5/2013 | Kortemeyer et al. | |
| 2014/0272859 A1 * | 9/2014 | Mueller | G06Q 30/0251 |
| | | | 434/257 |
| 2015/0213723 A1 * | 7/2015 | Vattikonda | H04L 67/02 |
| | | | 434/322 |
| 2017/0032434 A1 | 2/2017 | Ker et al. | |
| 2017/0139690 A1 | 5/2017 | Pesarese et al. | |
| 2017/0228239 A1 | 8/2017 | Elassaad | |
| 2018/0101874 A1 * | 4/2018 | Laski | G06Q 30/0271 |
| 2018/0293907 A1 * | 10/2018 | Meltzer | G06F 16/382 |
| 2019/0294550 A1 * | 9/2019 | Hori | G09B 7/00 |
| 2020/0117354 A1 | 4/2020 | Pesarese | |
| 2020/0272434 A1 | 8/2020 | Klemenz et al. | |

OTHER PUBLICATIONS

International Search Report and Written Opinion of the International Searching Authority issued in International Application No. PCT/CA2024/051517, Feb. 19, 2025, 12 pages.

* cited by examiner

*Primary Examiner* — Peter R Egloff
(74) *Attorney, Agent, or Firm* — Aird & McBurney LP

(57) ABSTRACT

A system for generating content for users with various accessibility needs, the system comprises at least one memory device configured for storing instructions; and at least one processor coupled to the at least one memory device and configured to execute the instructions to at least: generate a user interface for creating a first content tailored for an inclusive and accessibility-first learning experience, the user interface comprising a first set of graphical user interface elements selectable for creating the first content comprising a first set of content layers.

17 Claims, 18 Drawing Sheets

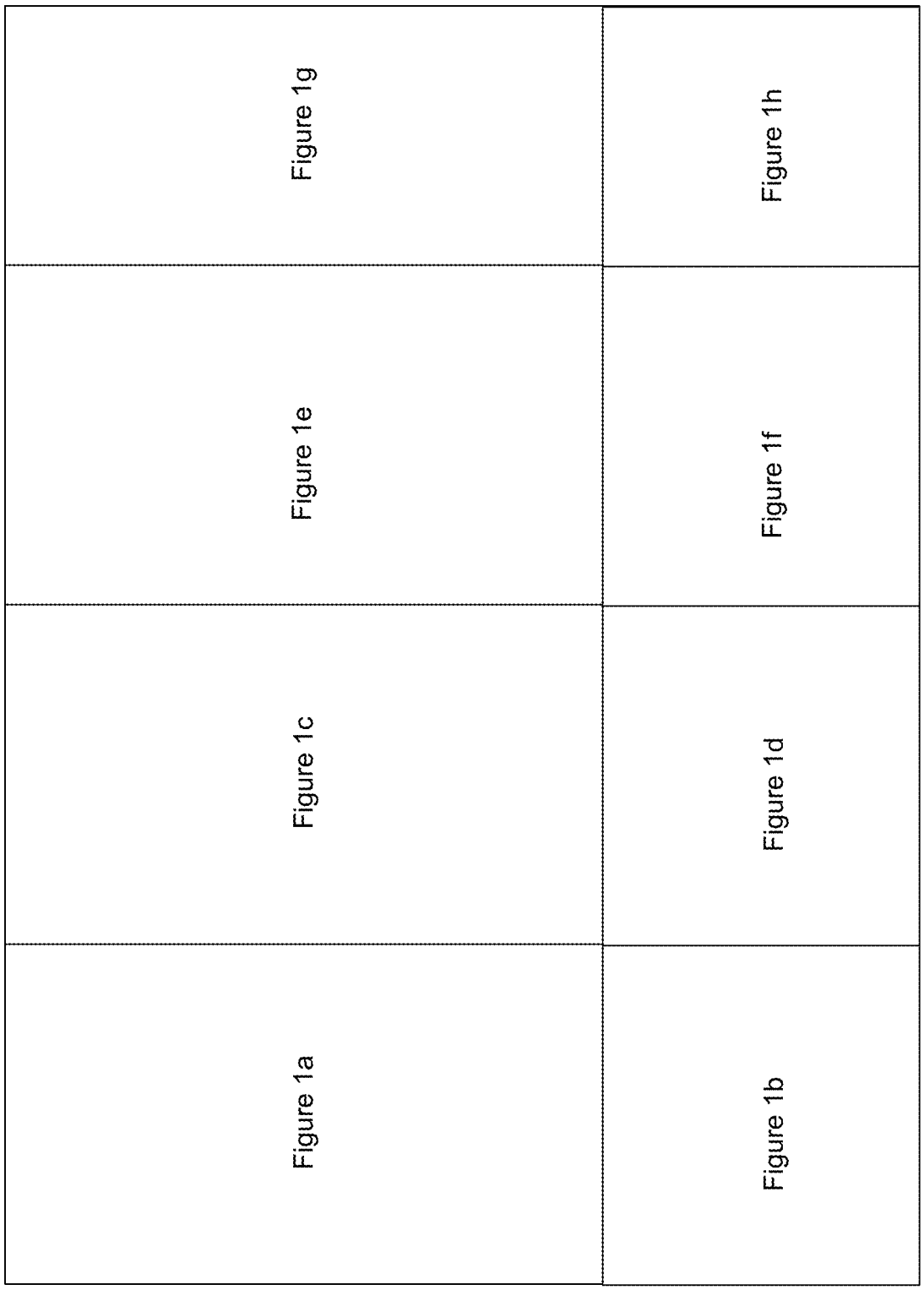

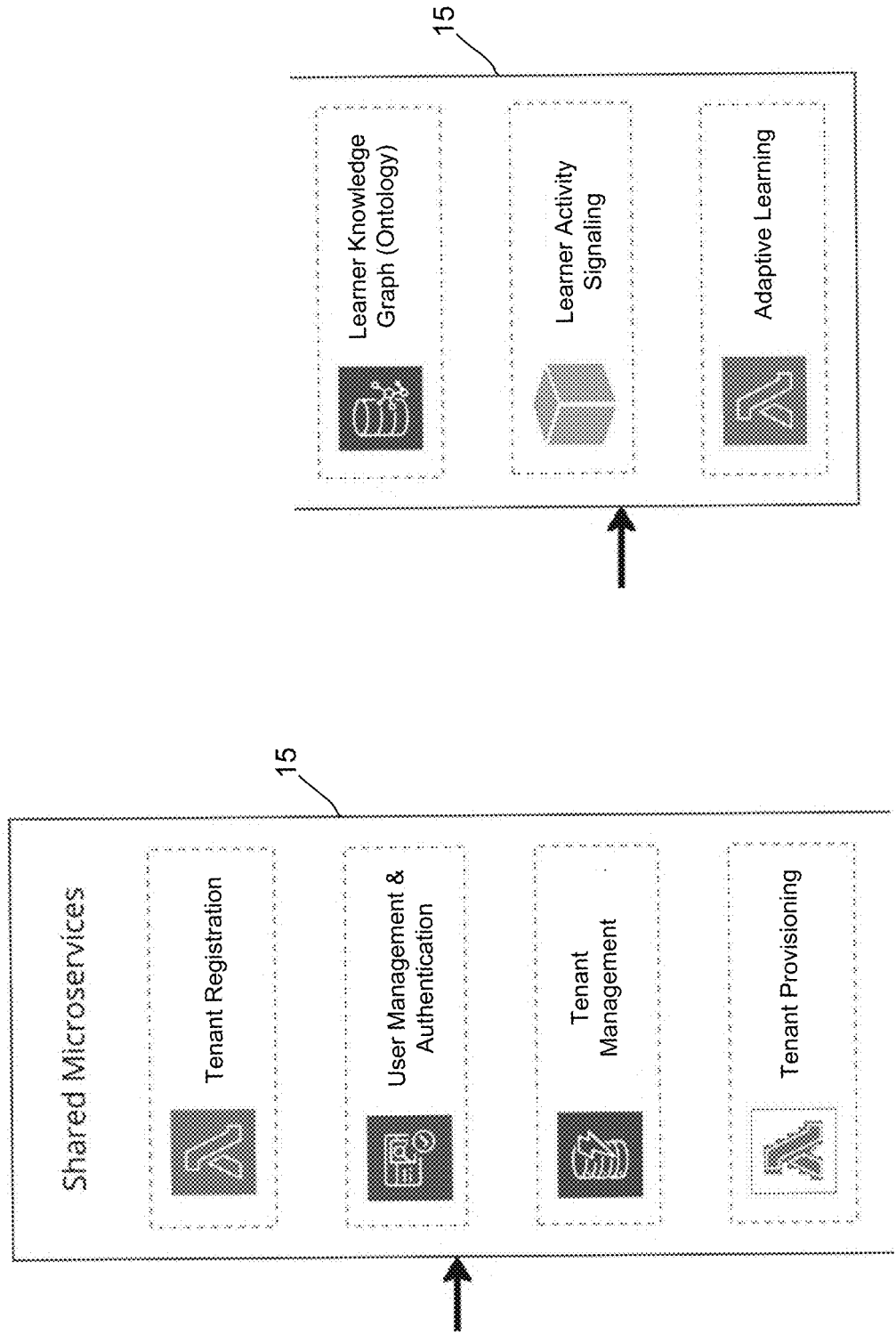

200

ACCESSIBLE e-LEARNING SYSTEMS AND METHODS

FIELD

The present disclosure relates to methods and systems for e-learning.

BACKGROUND

Generating and providing truly portable and accessible online content is a challenge in the e-learning industry. There exist standards for development of accessible e-learning, such as the World Wide Web Consortium's (W3C) Web Content Accessibility Guidelines (WCAG 2.0), Authoring Tool Accessibility Guidelines (ATAG 2.0), and Accessible Rich Internet Application (ARIA 1.0) specification. However, these standards are deficient in addressing the challenges associated with accessible content development, especially the economic challenges with developing online content that fully meets the needs of the students or learners not just in e-learning, but in all areas of online content management.

Several solutions have been proposed to tackle this problem in the four sectors in the educational content space, such as learning management systems (LMS), online, authoring tools/content management systems, education providers, and learning content management systems (LCMS). Generally, learning management systems are closed environments where students study, are assessed, and actively interact with one another. These systems are analogous to online classrooms. Example products include Blackboard® from Anthology Inc., U.S.A., Instructure® by Canvas Inc., U.S.A., Schoology® from PowerSchool Group LLC, U.S.A., Brightspace® from D2L Corporation, Canada (and open-source solutions like Moodle® and Sakai®. Online education providers are also closed ecosystems of independent learning, and example products include Pluralsight Skills®, LinkedIn® Learning, Coursera®, Udemy®, Udacity®, and Masterclass®. Authoring tools or content management systems comprise software and services that authors, such as web developers, designers, writers, etc., can use to produce and manage web content e.g., static web pages, dynamic web applications, for websites, blogs, media, and ecommerce-style sites. Example products of authoring tools or content management systems include Shopify®, Wix®, Weebly®, Progress Sitefinity®, Squarespace®, and Open-Source solutions e.g. WordPress® and Drupal®. Learning content management systems are used to develop course content for either distribution to LMSes or direct consumption directly by students or learners. Example LMS products include Top Hat®, Articulate®, Turning®, and Lectora®.

With respect to the authoring tools, accessibility support in the market today is focused on functionality that is best reflected by the W3C's Authoring Tools Accessibility Guidelines (ATAG) which define how to make the authoring tools themselves accessible, such that people with disabilities can create web content, and help authors create more accessible web content, specifically: enable, support, and promote the production of content that conforms to WCAG. These guidelines reflect an approach to content contained in these tools that assumes that the consumer will consume web content; and that the primary consumer of the content is an enabled person and that the point of the guidelines are to make the authoring tool provide a minimal level of accessibility support for disabled persons looking to consume this enabled person intended content.

At present, the market expectation for content development is designed to gracefully degrade the content experience, such that the most enabled consumers experience the content as intended, and the experience degrades for less enabled consumers in such a manner as it is designed to minimize the breaking of the experience for the less enabled consumers. For example, a content producer will for example record and make available a video which is best-suited to or provides the richest experience to fully enabled consumers i.e. those without disabilities, then add closed captioning and/or described video etc. to express what is in the video for the visually impaired. The challenge here is that from a learning perspective the nuance of the actual learning is designed around a visual experience that often does not translate fully to the transcription as the language prioritizes the description of the video content instead of the learning concepts. This methodology applies to most content that is produced by these existing systems whereby the primary intended audience is a fully enabled user with a desktop computer or a tablet such that fully enabled user enjoys the best experience, while the experience is degraded for individuals with accessibility, equity, or device challenges.

As such, none of the products on the market today provide for the broader portability and accessibility needs of e-learning content producers (course publishers, educational institutions, and governments/educational ministries) to develop and manage content effectively from an accessibility-first perspective while also providing rich, highly engaging interactive experiences for fully enabled users.

SUMMARY

In one example, a system for generating content for presentation on a first end-user device and at least one second end-user device, the system comprising:
  at least one memory device configured for storing instructions; and
  at least one processor coupled to the at least one memory device and configured to execute the instructions to at least:
    generate the content;
    store the content in a headless format in which the content and an output format for presentation are separated;
    generate a first content output comprising a first set of content layers, wherein the first content output comprises a first content output format responsive to the first end-user device characteristics, wherein the first end-user device comprises minimal resources and/or specifications and the first content output format is direct towards an accessibility-first learning experience; and
    generate at least one second content output comprising the first set of content layers and at least one second set of content layers, wherein the at least one second content output comprises at least one second content output format responsive to the at least one second end-user device characteristics, wherein the at least one second end-user device comprises non-minimal resources and/or specifications.

In another example, a method for generating content for presentation on a first user device and a second user device, with a processor coupled to at least one memory device storing instructions, wherein the processor executes the instructions to at least perform the operations of:

generating content;

storing the content in a headless format in which the content and an output format for presentation are separated;

generating a first content output comprising a first set of content layers, wherein the first content output comprises a first content output format responsive to the first end-user device characteristics, wherein the first end-user device comprises minimal resources and/or specifications and the first content output format is direct towards an accessibility-first learning experience; and generating at least one second content output comprising the first set of content layers and at least one second set of content layers, wherein the at least one second content output comprises at least one second content output format responsive to at least one second end-user device characteristics, wherein the at least one second end-user device comprises non-minimal resources and/or specifications.

In another example, a computer readable medium storing instructions executable by a processor to carry out the operations comprising:

generating content;

storing the content in a headless format in which the content and an output format for presentation are separated;

generating a first content output comprising a first set of content layers, wherein the first content output comprises a first content output format responsive to the first end-user device characteristics, wherein the first end-user device comprises minimal resources and/or specifications and the first content output format is direct towards an accessibility-first learning experience; and generating at least one second content output comprising the first set of content layers and at least one second set of content layers, wherein the at least one second content output comprises at least one second content output format responsive to at least one second end-user device characteristics, wherein the at least one second end-user device comprises non-minimal resources and/or specifications.

Advantageously, the systems and methods described herein provide for a content management system (CMS) platform that stores e-learning content in a manner such that the learning content and presentation information are separated. The content is subsequently transcompiled automatically into highly portable, variable, and accessible e-learning experiences. As such, e-learning content producers (course publishers, educational institutions, and governments/educational ministries) may use the platform to build e-learning experiences that are accessible-first, and reflect inclusive-design with minimal additional effort relative to the effort needed to produce content on the desktop and tablet focused e-learning experience CMSes that prevail in the market today.

The systems and methods enable the generation of content that may be consumed in various formats well beyond "web content" by decoupling the content from its presentation and providing a reliable means of exporting the content in other output formats. While the systems and methods promote inclusive design, the content produced is equally consumable by disabled and enabled persons, more emphasis is placed on the needs of disabled persons, who are viewed as the primary consumer from an authorship perspective. The difference in approach is best reflected in the latest ATAG version at the time of writing (2.0) recommendation B.2.3.1 "Alternative Content is Editable (WCAG)", where the guideline states that "if the authoring tool provides functionality for adding non-text content, then authors are able to modify programmatically associated text alternatives for non-text content". The equivalent functionality for this recommendation in the system presented herein would recite "if the authoring tool provides functionality for adding text content, then authors will be able to modify programmatically associated non-text alternatives for the text content". As an example, in the event that a video is to be added as part of the content, the system expects text content and provides the ability to include a video alternative to that text.

Generally, the systems and methods allow for the development of portable and deeply accessible online learning experiences that can simultaneously address numerous learning experiences from print experiences for users with device limitations, screen readers of students with accessible needs, internet-limited devices, or no internet students with computer or mobile devices, offline experiences for device and internet-enabled users who prefer to save bandwidth, traditional means of consumption on variant learning management systems (Sharable Content Object Reference Model (SCORM)/xAPI), and live hosted experiences across variant learning management systems. As such, the content is stored in a headless format, where the content and the presentation are separated, and the content details are saved as metadata instead of code. The content is transcompiled and exported for publication in a plurality of formats to address the variable learning formats needed to tailor experiences to accessibility-first.

The systems and methods described herein intentionally reverse this paradigm by designing the authoring experience that is primarily intended for the least enabled consumers first so that they can fully learn the material regardless of their disabilities or device limitations. The learning is then progressively enhanced with interactivity such that all users have the best learning experience to their inherent capabilities. Of note, this is not simply providing the faculty for alternative content, though aspects of it would apply, rather it is a complementary state of content where the content is shared among different experience states and edited in such a shared state. In other words, the system is not designed as a "print version" that is distinct from a "fully digital version". Rather it is designed to manage content in a hybrid state between the variant experiences supported such that e-learning content producers (course publishers, educational institutions, and governments/educational ministries) can write and maintain content that facilitates numerous experiences and builds alternative content for more enabled learners.

The systems and methods endeavor to address a significant portion of the economic barriers associated with producing content of this nature by drastically reducing the overhead and complexity and fundamentally shifting the approach to content design.

BRIEF DESCRIPTION OF THE DRAWINGS

FIG. 1 with partial views FIGS. 1*a*-1*h* shows a tenant infrastructure for publication, versioning, distribution, and remote management of e-learning content for plurality of learner experience types;

DETAILED DESCRIPTION

Figure 1A:
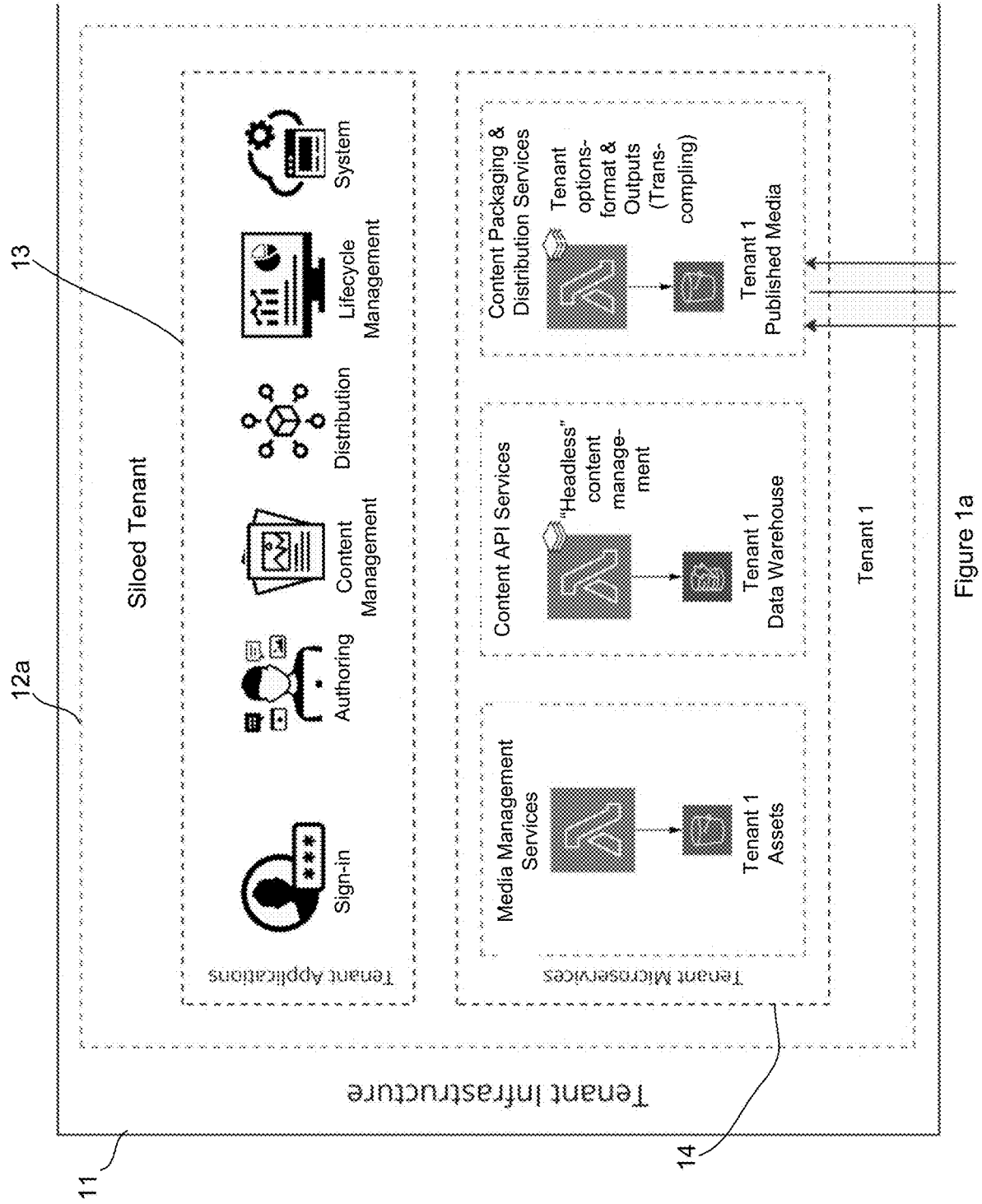
Figure 1B:
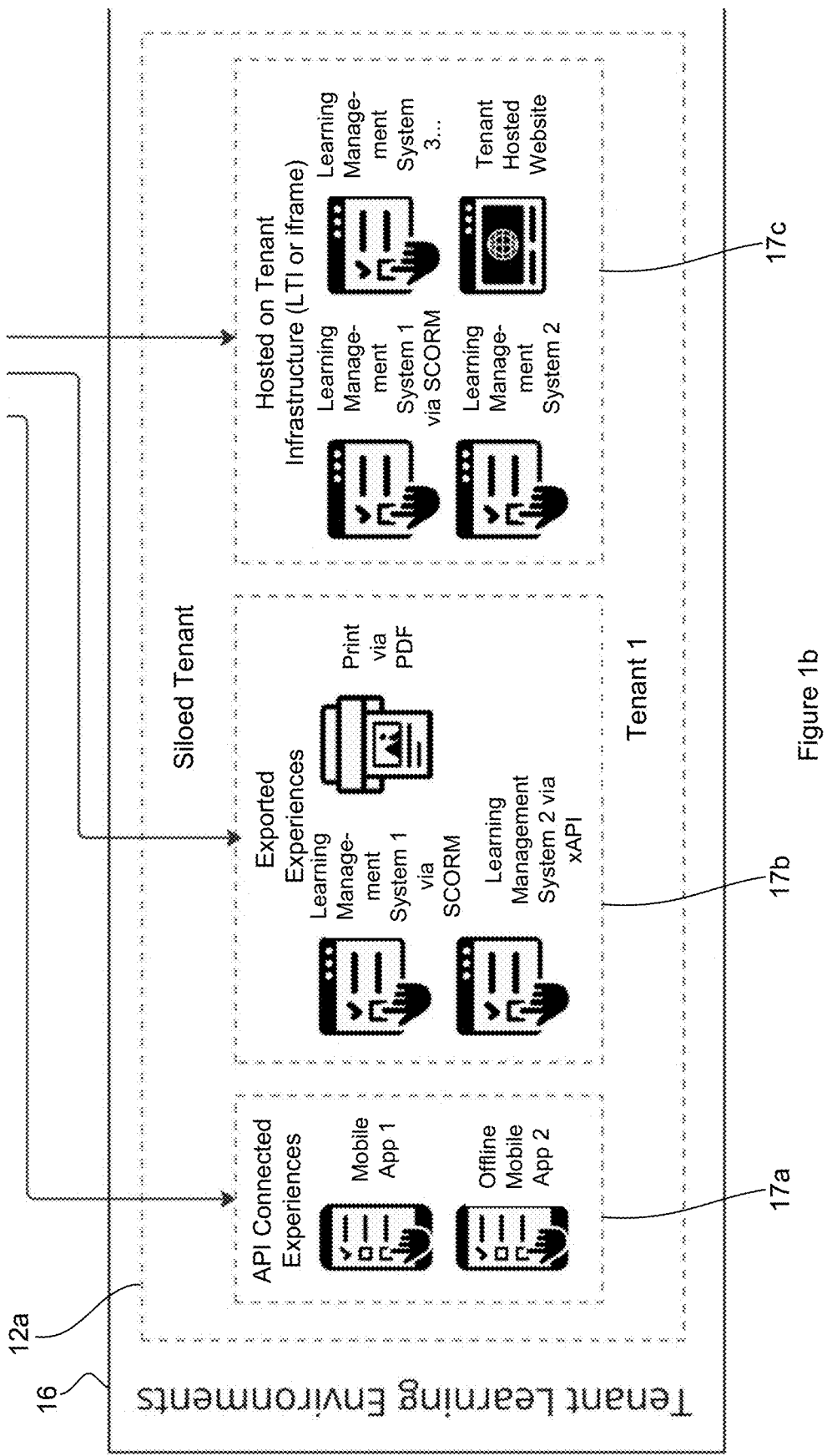
Figure 1C:
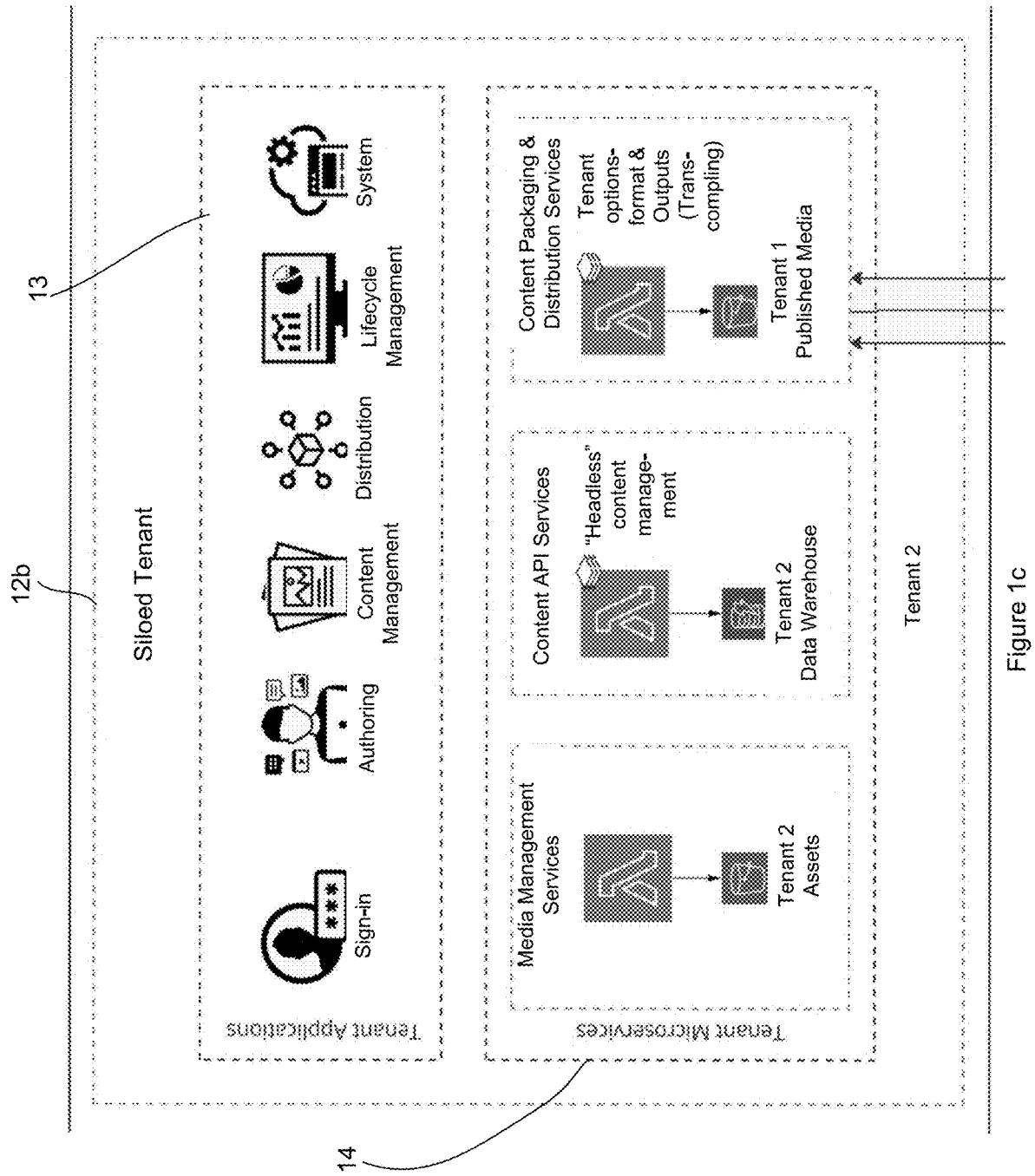
Figure 1D:
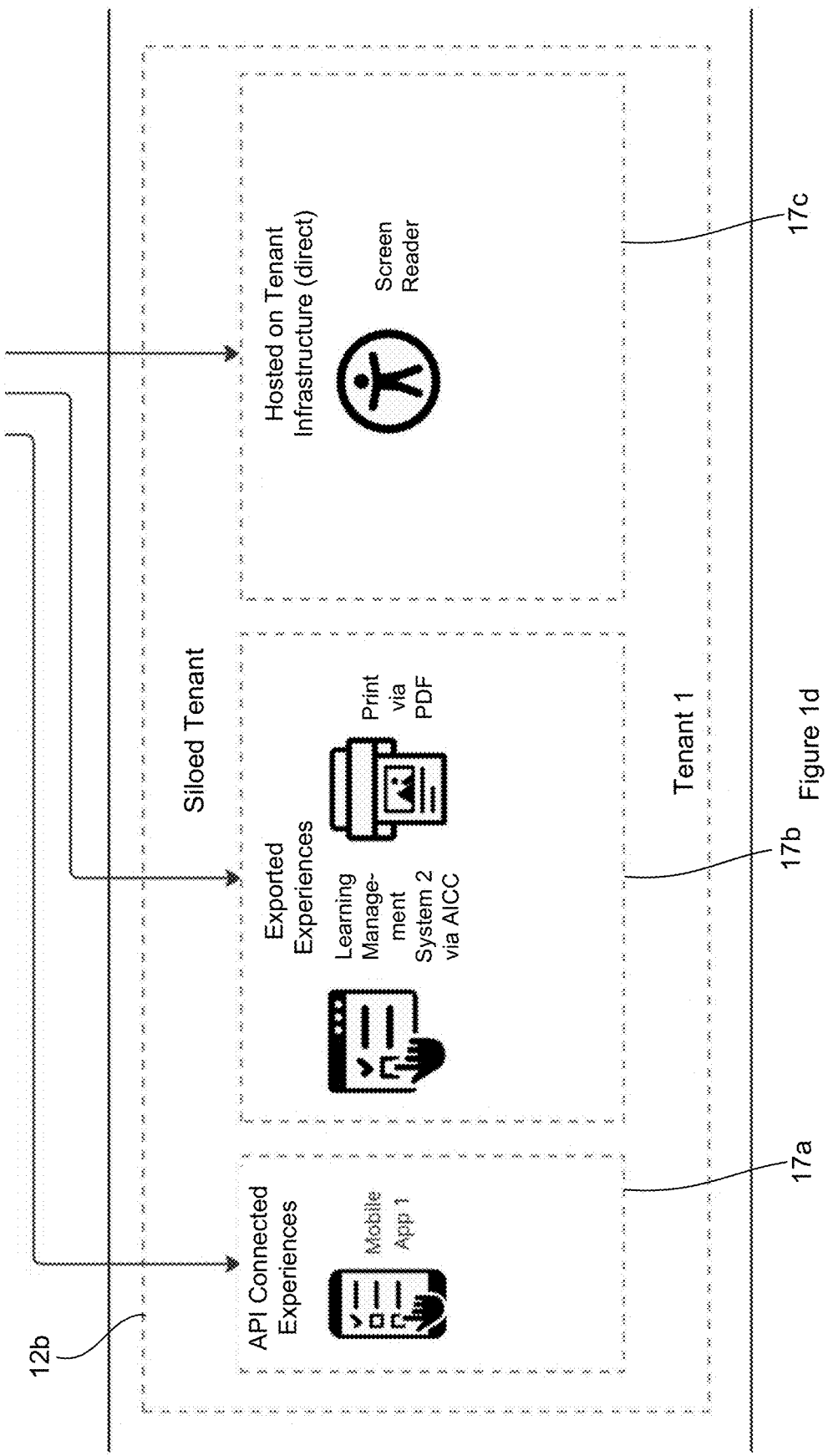
Figure 1E:
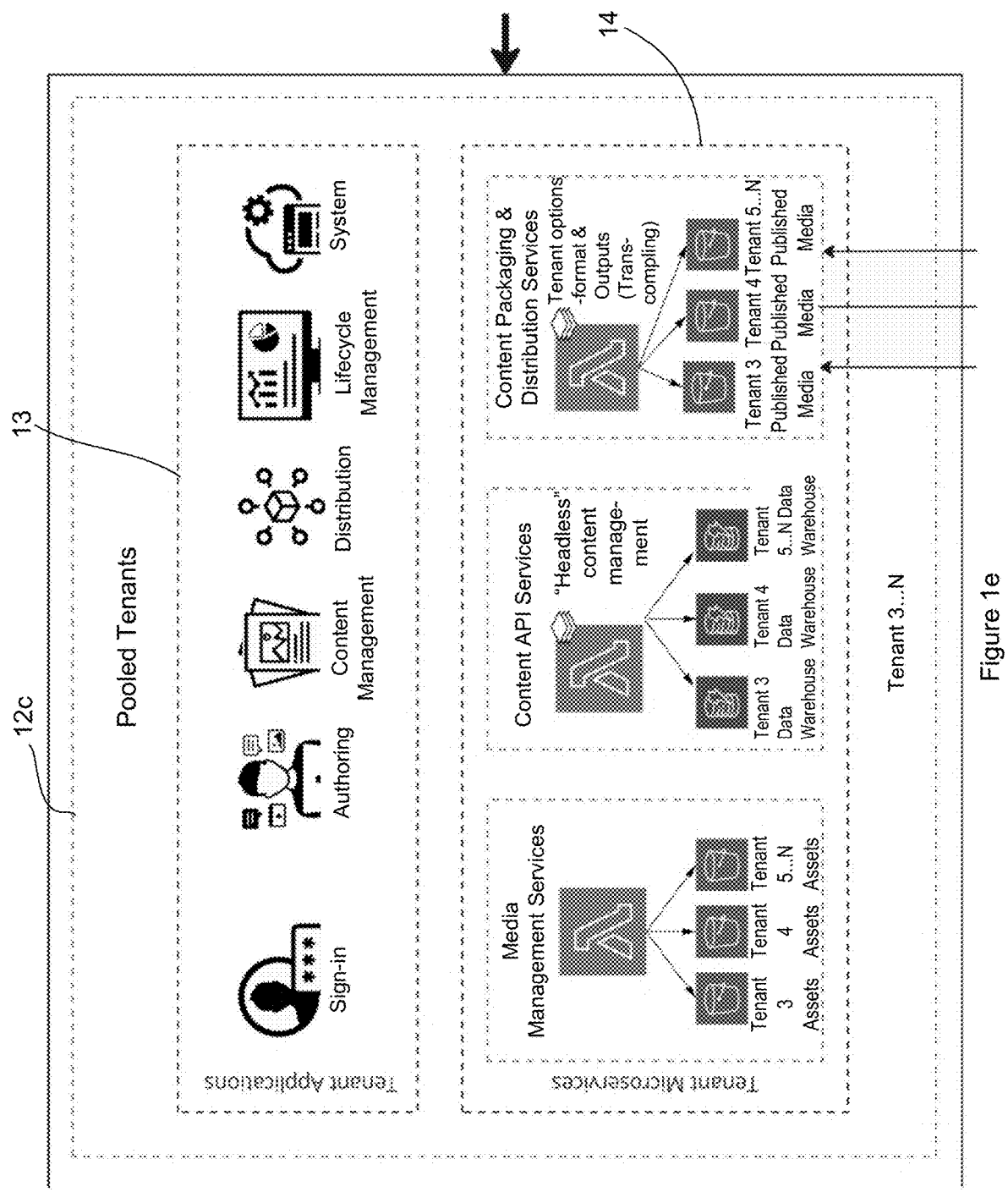
Figure 1F:
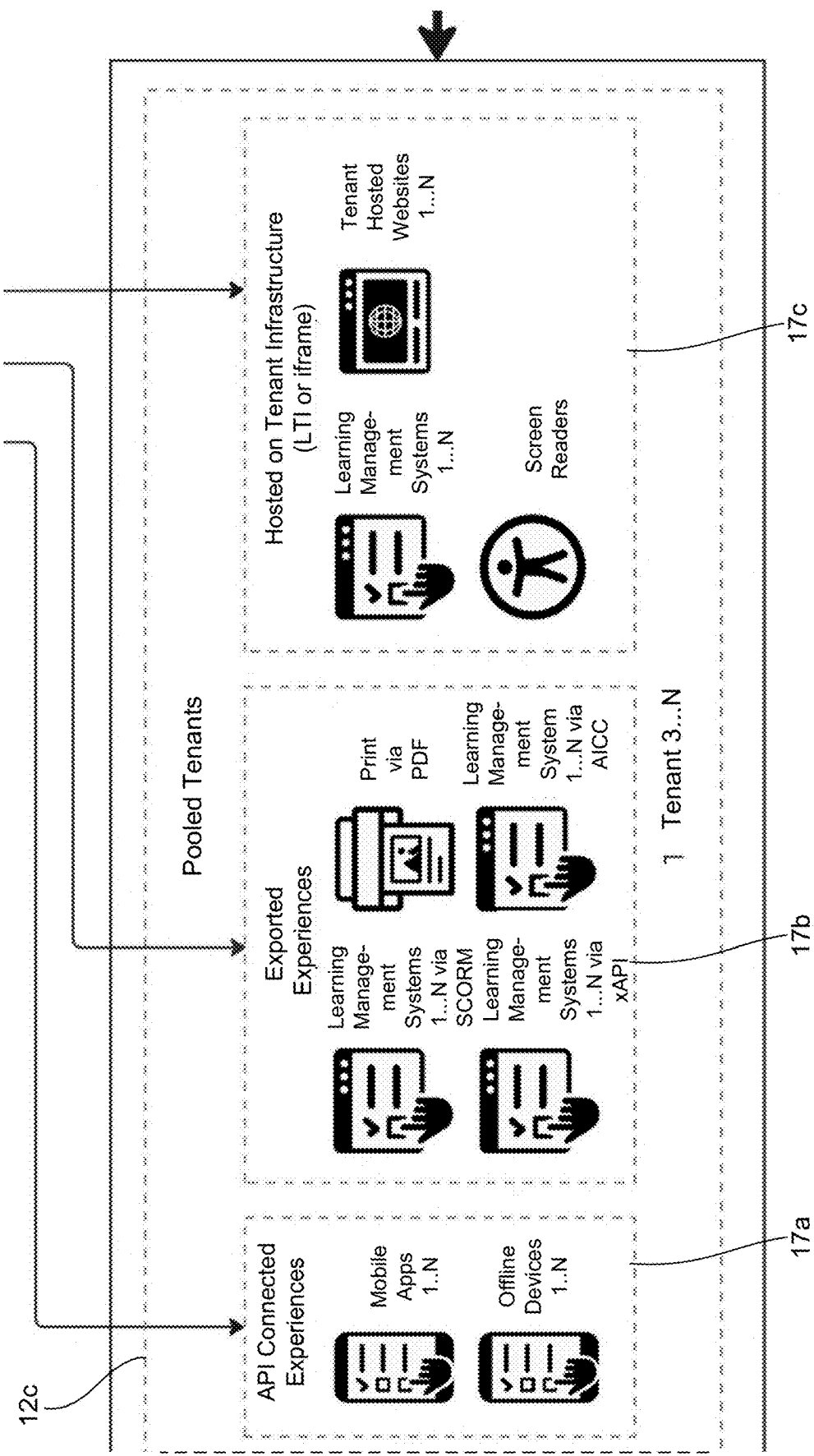

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Moreover, it should be appreciated that the particular implementations shown and described herein are illustrative of the invention and are not intended to otherwise limit the scope of the invention in any way. Indeed, for the sake of brevity, certain sub-components of the individual operating components, and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Generally, methods and systems described herein pertain to a software-as-a-service (SaaS) application designed to address the publication, versioning, distribution, and remote management needs of e-learning content across multiple learning environments. A SaaS provider provisions the application and platform to customers or "tenants" of the system. Within a tenant, numerous types of users of the tenant's applications (the applications designed to publish, version, distribute, and manage the content) are possible, additionally learners using content produced by the system are also restricted to that tenant except when explicit permission to share or move primary data ownership has been applied (such as when a learner transfers to a new school).

The systems and methods described herein are configurable to build e-learning experiences that share the same learning topic, also known as a knowledge component, among multiple clients and e-learning experiences. This collection of learning topics form a shared ontology (or dictionary) that enables all tenants to share anonymized learning data and benefit from the system by learning from this shared learner data set. This sharing allows for enhancing the adaptive learning experiences for each learner, which would not be attainable otherwise.

In FIG. 1, there is shown a system 10 for authoring, publishing, versioning, managing and distributing e-learning content across multiple learning environments. The system 10 comprises a tenant infrastructure 11 representing two types of tenants; siloed tenants 12a, 12b, where all applications and tenant microservices are made available explicitly for that tenant's use, and pooled tenants 12c where tenant applications 13 and microservices 14 are shared though the experience is distinct for each tenant 12a-c. Practically, all tenants 12a-c have the same operating experience, the difference between these tenant types reflects an infrastructure differentiation primarily driven by the size of the client and the expected load on the SaaS system.

The tenant microservices 14 serve the functionality required for the tenant specific applications for media management (file management, transcoding, caching, etc.), content management (data warehousing of headless content), and packaging and distribution (transcompiling to the tenant's format, styling, and output requirements). Shared microservices 15 serve both the tenant application 13 and learning environments 16 with functions either not needing to be balanced on load concerns, or where anonymized "big data" shared across tenants can be valuable for all tenants using the system, such as, shared learner data informing numerous tenant experiences. Example shared microservices 15 comprise tenant registration, user management and authentication, tenant management, tenant provisioning, learner knowledge graph (ontology), learner activity signaling and adaptive learning.

In both siloed and pooled tenant cases 12a-c, three types of tenant learner experiences are supported i.e. API connected experiences 17a, exported experiences 16b (the traditional model the industry currently relies on), and hosted experiences 17c on tenant infrastructure. API connected experiences 17a and hosted experiences 17c differ only in the methods necessary to connect a tenant's clients' learning management system, applications, or hosted environments with the tenant's infrastructure for delivering and updating the experiences.

Figure 2A:
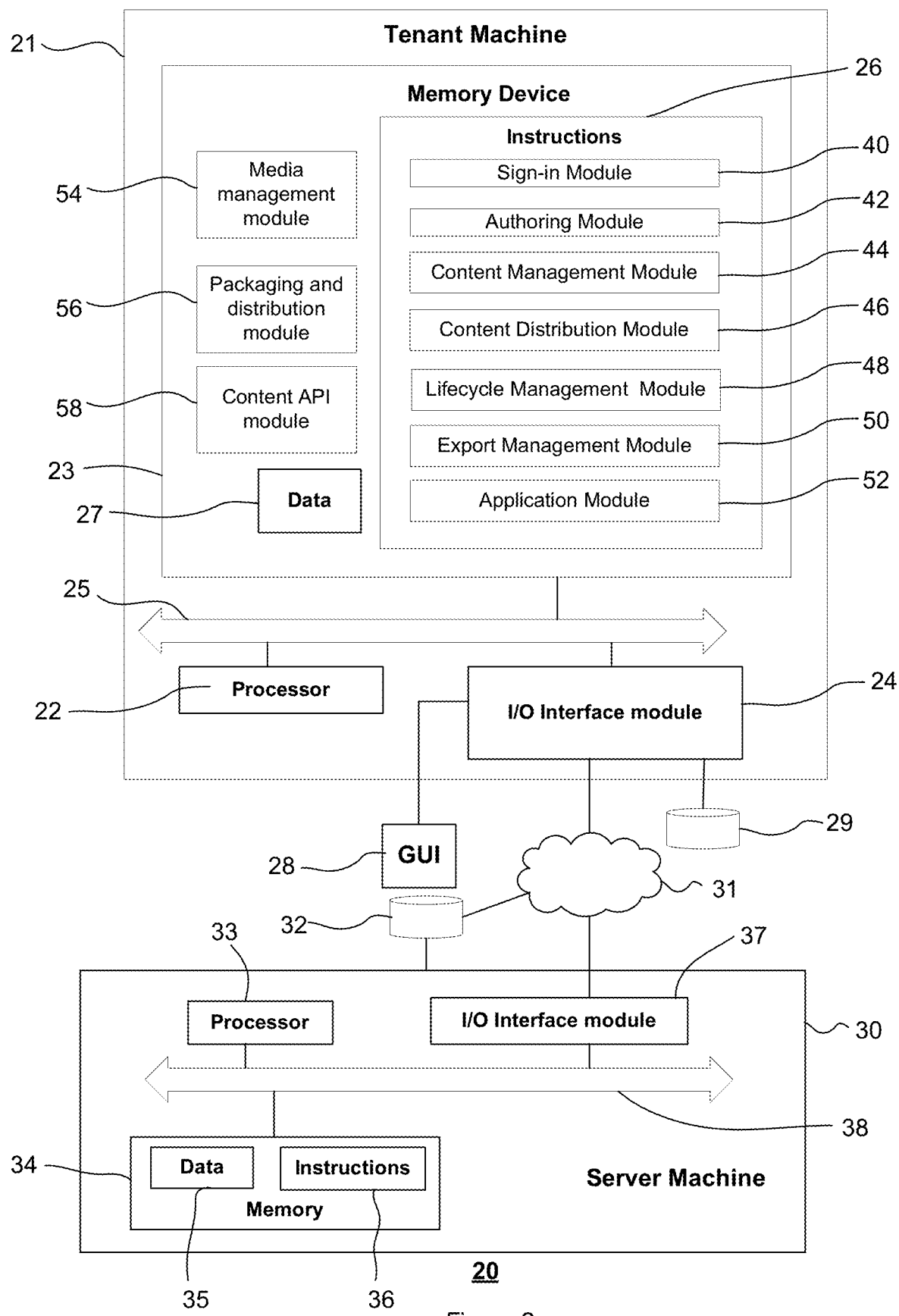
FIG. 2a shows a top-level diagram of an overall system architecture for developing content for distribution in a plurality of learner experience types.

FIG. 2a shows an overall system architecture 20 comprising a client user device 21, or tenant device, with a processor 22, memory device 23 and input/output interface module 24, interconnected by communications bus 25. The client user may be a customer who may be represented as a "tenant" of the system 20, such as a school, college, university, or other educational institution that serves end users, such as students or learners. Tenants have access to tenant applications for publishing, versioning, distributing, and managing the content. In one example, learners consuming the produced content are also restricted to that tenant except when explicit permission to share or move primary data ownership has been approved e.g., when a learner transfers to a new school and therefore switches from one tenant to another tenant.

In one example, memory device 23 is capable of storing machine executable instructions 26 e.g., tenant applications, data 27, including data models and process models. Further, the processor 22 is capable of executing the instructions 26 stored in memory device 23 to implement aspects of processes described herein. For example, processor 22 may be embodied as an executor of software instructions 26, wherein the software instructions 26 may specifically configure the processor 22 to perform algorithms and/or operations described herein when the software instructions 26 are executed. Alternatively, the processor 22 may execute hard-coded functionality. Client device 21 also comprises a graphical user interface (GUI) 28 and database 29 coupled to tenant user device 21 via I/O interface module 24.

The client device 21 may be communicatively coupled to a server machine 30, such as a SaaS server computer, via a communication network 31. The server machine 30 provides a SaaS application designed to address the publication, versioning, distribution, and remote management needs of e-learning content across multiple learning environments. Coupled to the server machine 30 is one or more shared databases 32 that are shared by the tenants. The one or more shared databases 32 may be communicatively coupled directly to the server machine 30 or via network 31. Similar to client device 21, the server machine 30 comprises one or more processors 33, memory device 34 storing data 35, including data models and process models, and instructions 36, I/O interface module 37, interconnected by communications bus 38.

At the client device 21, instructions 26 stored in memory device 23 comprise several service modules, such as: sign-in module 40; authoring module 42; content management module 44; content distribution module 46; lifecycle management module 48; export management module 50; application management module 52; media management module 54; packaging and distribution module 56; and content API module 58.

Sign-in module 40 comprises an identity and access management (IAM) service for administrators, customers, and applications throughout the tenant system; authoring module 42 provides a lesson and page builder environment, a discreet editing environment that may provide drag and drop and keyboard-based controls for developing content that supports print and digital experiences for the same set of content. Example features of the system include but are not limited to print and digital components that can be used for both print and digital student experiences divided into non-interactive components typically equivalent to HTML elements or small groupings of HTML elements such as, but not limited to, headers, paragraphs, and images, and an assessment engine which manages all components and question types related to quizzing, exams, and other assessments of student experiences. Digital only components may be used for digital student experiences in view of their interactivity and technology requirements, are divided into interactive components typically equivalent to HTML elements or small groupings of HTML elements and associated interaction such as, but not limited to, accordions, tabs, carousels, dynamic tables and iFrames. These components often wrap, nest, or elevate other Print and Digital or Digital Only experiences and may have configuration options for tailoring the expected experiences; interactive learning objects (ILOs) which are interactive components that have been specifically designed around learning outcomes, and enable students to better visually understand and virtually interact with phenomena they learn in the course material, such as, but not limited to, periodic table of elements, environment simulations, and virtual labs; and preset experience library components which are standalone experiences with minimal configuration options such as, but not limited to standalone games which can be included in the curriculum largely "as-is". Other features of the system associated with the authoring module 42 comprise asset manager 54 which handles uploading, editing, metadata, and inclusion of media such as images and video into the authored experience; collaboration tools for visualizing and managing shared manipulation of content asynchronously or synchronously as the material is built and reviewed. Functionality includes, but is not limited to, visibility of simultaneous user activity, commenting, and review process sharing and management; adaptive learning content management including tagging functionality, knowledge graph use and extension, and content section management.

Content management module 44 is responsible for learning content development system for creating, editing, and managing the lessons and supplementary materials for each course package. The system loads the authoring system for each content piece that is being developed and enables the organization and grouping of the resulting materials into a course outline that instructs the packaging of course packages upon publication ("publishing") of a finalized course. Example features of the authoring system include but are not limited to: a course builder system, an overarching system for creating, editing, and managing courses within the system; a course outlines system for organizing all learning content of a particular course or course instance in preparation for publication; a content repository which stores content produced within the authoring system as headless content which is content that is described independently from its presentation layer save for reflections of components that were used. For example, but not limited to, a reference to the inclusion of a video as a video ID and platform reference, but no code for producing the appropriate player for that video experience. Also included is a course packaging system for publishing a finalized course into the appropriate formats in preparation for distribution; a catalogue management system for grouping a collection of one or more courses together that can be made available through content distribution module 46 to either other tenants or the public for various uses, such as but not limited to direct registration; version control, a system that tracks and manages all changes within the system, both at a authoring level and within other areas of the content management system; a article builder system, an overarching system for creating, editing, and managing all content produced by the system that is not a course, such as but not limited to knowledge base/help articles and blog posts; the overarching system uses the same authoring system for content management as the course builder, with learning components reduced or suppressed in favour of expanded journalist components.

Content distribution module 46 comprises a system responsible for creating, editing, and managing the distribution of these materials to other tenants or public end points. Some features of the content distribution system 46 include, but are not limited to: reporting and management of how and where the courses are distributed via automated tracking of any "live hosted" experiences; reporting and management of how and where the courses are distributed via manually tracking for any non-"live hosted" experiences; and the systems for managing such distributions, such as but not limited to, sending new live updates or exporting new versions for non-"live hosted" experiences and manually updating distribution details.

Lifecycle management module 48 is a system and environment for the overall tenant SaaS application. Some features of the lifecycle management module 48 include, but are not limited to: a reporting engine for all data related reporting functions of the application, such as but not limited to, systems usage and performance, distribution tracking, learner progression, class progression; notification services for managing user and system notifications both within and outside of the application; an update manager for managing application updates automated or otherwise; federation and access control for managing users, permissions, and groups and for turning on and off features and settings from the system; and security and monitoring for managing security related concerns.

Export management module 50 is system responsible for transcompiling courses and articles to the tenant's format, styling, and output requirements. Some examples of outputs include, but are not limited to: a PDF format for users with limited or no access to devices who are looking for a printable copy of a course; an accessible-first HTML version of a course for users using assistive technology such as a screen reader; an offline version of the course with full digital interactivity enabled for users with limited or no access to the internet but who do have access to a digital device such as a computer or smartphone; a traditional LMS package for administrators looking to upload a static or traditional SCORM (or similar format) package to a LMS for students to study from; a remotely managed LMS package for administrators looking to distribute courses to LMSes that can be updated directly and in real-time from within the platform without the need to upload a new version; and directly hosted standalone experiences, whether public or behind a managed login, which are not dependent on a third party LMS.

Application management module 52 is responsible for the tenant's account related functions such as but not limited to, billing, knowledge base, technical support, account management, third party integrations, theming, licensing, and shared service subscriptions, and permissions.

Media management module 54 comprises the microservices behind the system's asset manager for handling uploading, editing, and metadata of media. Some features of the media management module 54 include, but are not limited to: asset variants from such actions as cropping, colour manipulation etc. that are saved independently from but in direct relationship to the source material; compression and optimization services for reducing and streamlining file sizes and metadata of assets; and services for managing assets between local and remote file systems such as cloud storage providers.

Packaging and distribution module 56 comprises microservices responsible for supporting the course packaging module 44 and content distribution 46 services of the system, as will be described in more detail with reference to FIGS. 3 and 5.

Content API module 58 comprises microservices responsible for transferring data and meaning of the content between the content store of databases and the requesting services.

It is to be appreciated that the particular arrangement of modules 40-58 illustrated in FIG. 2a embodiment is presented by way of example only, and alternative arrangements can be used in other embodiments. For example, the functionality associated with the modules 40-58 in other embodiments can be combined into a single module, or separated across a larger number of modules. As another example, multiple distinct processors 22 can be used to implement different ones of the modules 40-58 or portions thereof. At least portions of the modules 40-58 may be implemented at least in part in the form of software comprising program code 26 stored in memory device 23 and executed by processor 22.

In one example, it is assumed that a tenant user associated with one or more of the client devices 21 is attempting to access services and applications on a server machine 30 over the network 31, and that access to the services requires successful tenant user authentication to the server machine 30. As such, the server machine 30 may include an authentication server running an identity and access management (IAM) service for users, such as administrators, customers, and applications throughout the tenant system.

The authentication or validation process begins with the tenant user entering login credentials on a user-interface 28 presented on a display associated with the tenant user device 21 and provided by a web server at the server machine 30. In an operation, the tenant user enters identification information that may include a user ID and a password. First time users may be required to provide personal information and to select the user ID and/or the password before being allowed to continue. The user submits the identification information to the server machine 30. A test is implemented in an operation to determine if the identification information authenticates the tenant user. For example, if the submitted user identification information matches the information stored in a database for a known valid user of the service, the user is authenticated. If not, the user is redirected back to the login user interface or to an error page and may try to log in again. If the user is successfully authenticated, the tenant user is provided access to the service provided at the server machine 30.

Upon successful completion of the validation procedure, the tenant user initiates a service provided by an authoring module 42, which allows the tenant user to author content, such as course materials. For example, authoring module 42 provides a suitable user-interface 28 with an authoring environment for building pages for lessons and/or courses. In one example, the authoring environment comprises a discreet editing environment that provides drag and drop and keyboard-based controls for developing content. In one example, the same developed content is suitable for both print and digital experiences. As such, print and digital components that can be used for both print and digital end-user experiences divided into non-interactive components typically equivalent to HTML elements or small groupings of HTML elements such as, but not limited to headers, paragraphs, and images.

The systems and methods are configured to build e-learning experiences that are accessible-first and reflect inclusive-design with minimal additional effort. This is accomplished by biasing the editing experience towards print and accessible-first considerations accompanied by component considerations that are designed for the progressive enhancement of content experiences. Content that is produced in this editing experience is saved in a "headless" format, a format that decouples the presentation of the content from its structure, which enables a method of centralized content management that supports numerous exported experiences. When an author chooses to publish and package their e-learning experience this "headless" content is transcompiled into various formats selected by the author. During transcompilation key aspects of presentation such as the theming/styling of the content and selecting the appropriate technologies for inclusion such as video streaming providers are applied to the content.

Figure 2B:
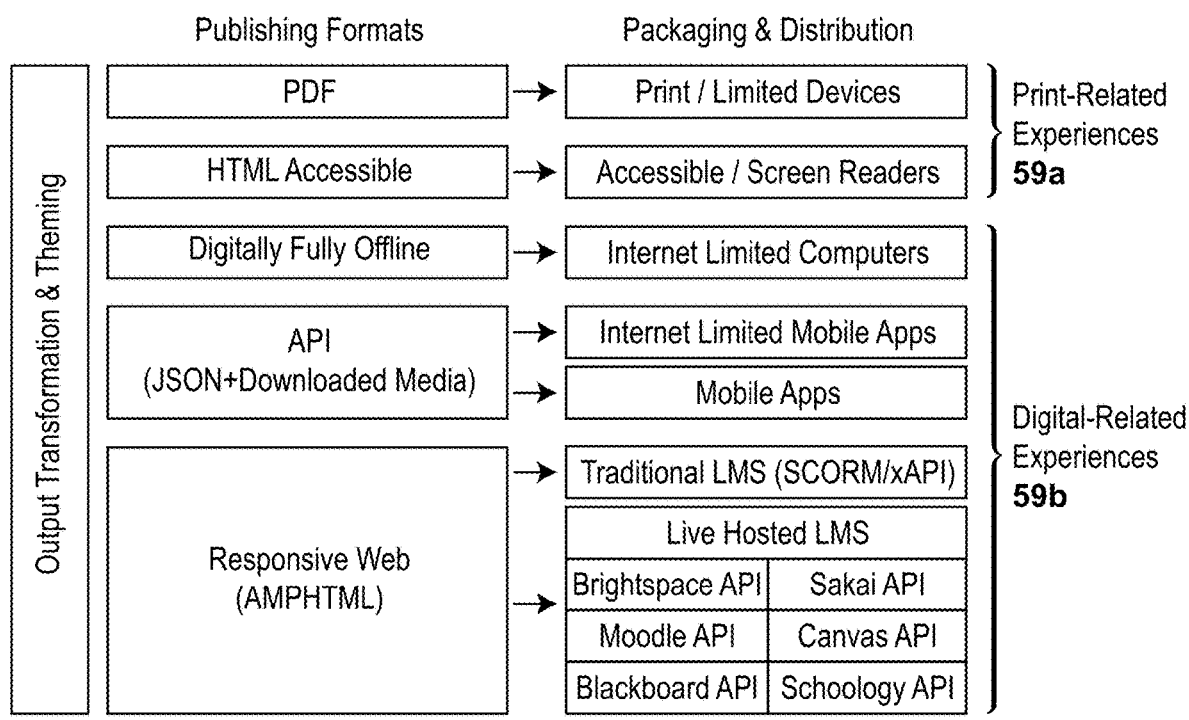
FIG. 2b shows two categories of exported experiences i.e. print-related experiences and digital-related experiences.

As shown in FIG. 2b, the system export capabilities can be divided into two categories of experiences from a content perspective, such as print-related experiences 59a and digital-related experiences 59b.

Print-related experiences 59*a* are experiences that are inherently dependent on text as a construct for delivery of the educational experience. These experiences include printed materials which can support individuals who have limited access to devices, such as computers, tablets, or smart phones, and individuals using assistive technologies, such as screen readers.

Digital-related experiences 59*b* are experiences that are inherently dependent on the text print-related experiences but are also progressively enhanced digitally. These experiences can support individuals with access to devices, such as computers, tablets, or smart phones, who may or may not have consistent access to the internet. For example, in remote communities, individuals may not have access, or at least reliable access to the internet, however they may have access to devices that can present a digital experience. These internet-limited devices can thereby present the digital experience in offline mode. For individuals who have access to devices and reliable internet access several experiences can be supported, such as but not limited to, direct hosted experiences where the individual visits a website or downloads a mobile app and studies within that environment, traditional LMS experiences where the content is uploaded to the LMS and learners study the material within that environment, or live hosted LMS experiences where the learners study the material within their LMS but the content is centrally distributed to them through a hosted experience on the server computer 30.

Figure 2C:
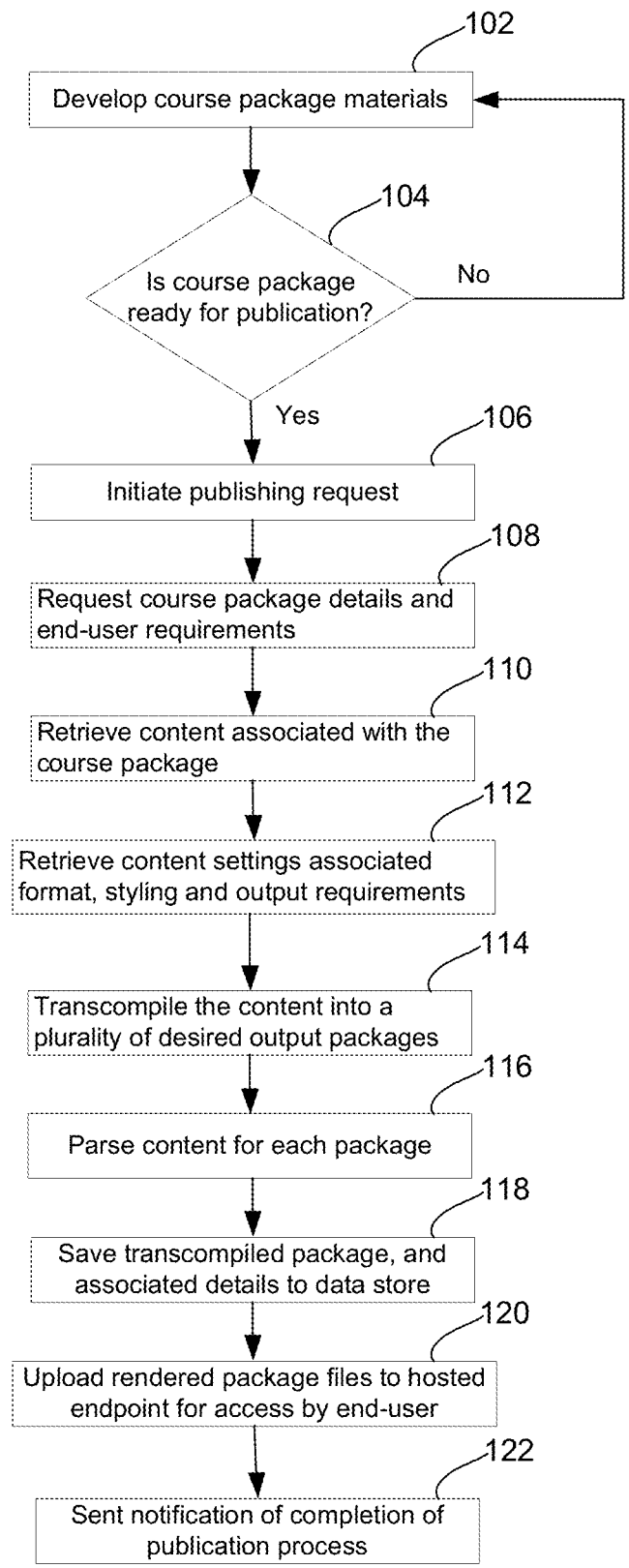
FIG. 2c shows a flow chart with example steps for developing content for distribution in a plurality of learner experience types.

In FIG. 2*c*, there is shown an example workflow for publishing content suitable to a plurality of content end-users or consumers, depicted as flow chart 100.

In step 102, a tenant user logs into server computer 30 via tenant user device 21 and uses the content management system 44 within the tenant SaaS application 26 running on the client device 21 to develop a course package in preparation for publication, following an authentication process as described previously.

Next, a decision is made as to whether the developed course package is ready for publication, step 104. When the developed course package is deemed not ready for publication, then the process loops back to step 102 for further edits, otherwise the course package is assigned a version identifier and details of the course package are stored in memory device 23, and a publishing request is initiated. A tenant packaging compute service (TPC) is called to manage the request (step 106).

In step 108, the TPC requests details on the package version, including one or more packaging instructions indicating the format, style, and output requirements for the desired learner experience.

In step 110, the TPC accesses a content API service and retrieves all content associated with the course package as described by the course outline system, via an API gateway.

Next, the TPC accesses the settings from the tenant application's export Management for system level instructions for the format, styling, and output requirements, via an API gateway (step 112).

In step 114, for each requested package export the TPC calls the tenant transcompiler compute service (TTC) to transcompile the content received from the Content API into the appropriate packages. As such, a transcompiler generates the packages in a format as dictated by the output requirements suitable the desired learner experience. For example, the output requirements may be different for printed and non-printed formats, or device specifications and capabilities.

Next, as the TTC processes each package it parses through the content and leverages the media management microservices to pull down the appropriate version of each media asset (step 116).

In step 118, the resulting transcompiled package is saved to a database store in its rendered form, and the details of the package are also saved to the database store.

The files are then uploaded as rendered files to a hosted endpoint for further action by the end-users of the system (step 120).

On completion of all packaging activities the TPC sends a notification of completion with details that were stored in the data store to the content management system 44 of the tenant SaaS application 26 enabling further action by the tenant user (step 122).

Figure 3:
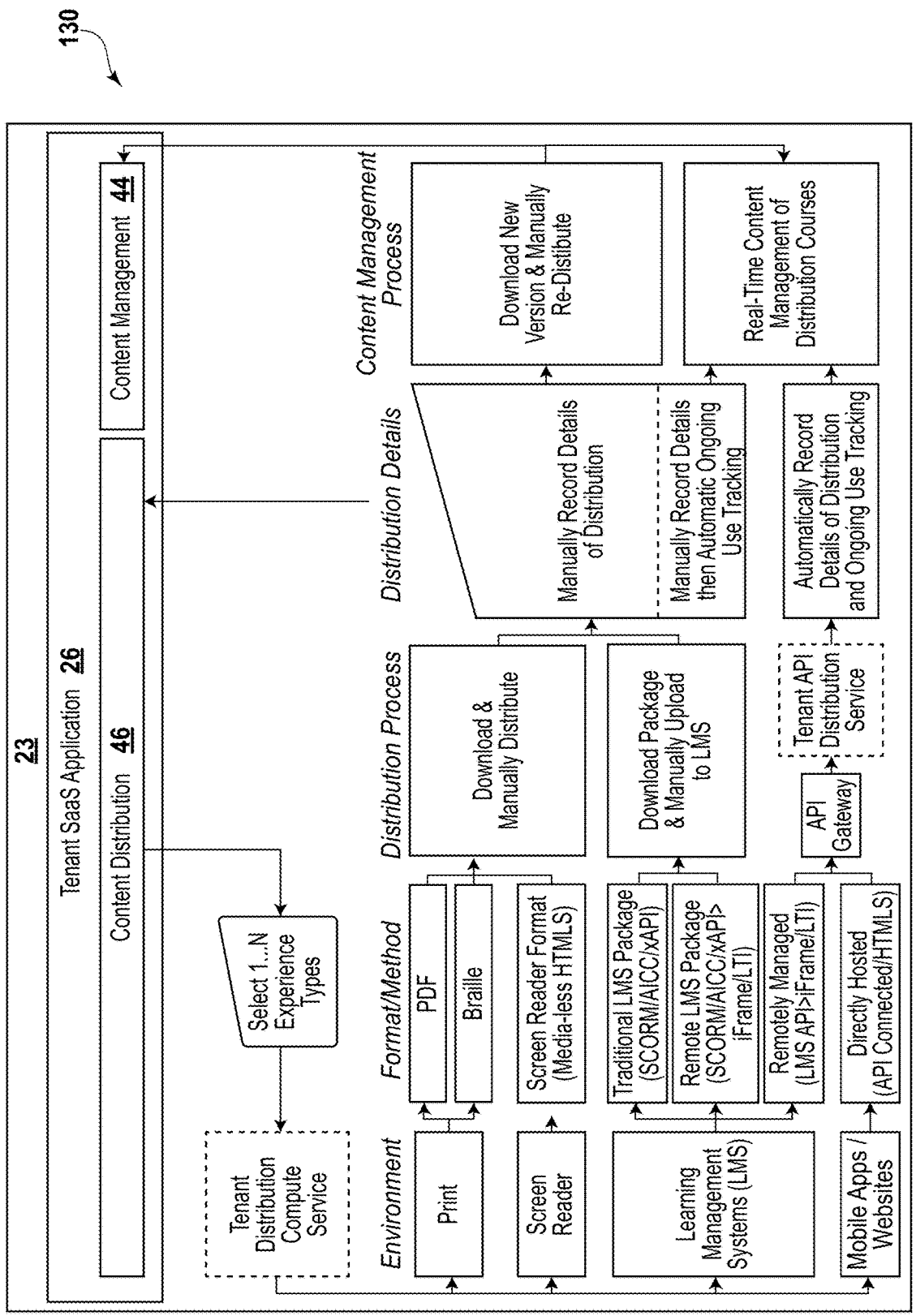
FIG. 3 shows a tenant content distribution infrastructure.

FIG. 3 shows a tenant content packaging infrastructure 130 comprising content distribution module 46 and content management module 44 stored in memory device 23 of tenant client device 21 running a tenant SaaS application 26. The content distribution module 46 and the content management module 44 carry out example steps 202-216 for publishing, transcompiling, packaging and distributing the content in accordance with a desired learning experience.

Figure 4:
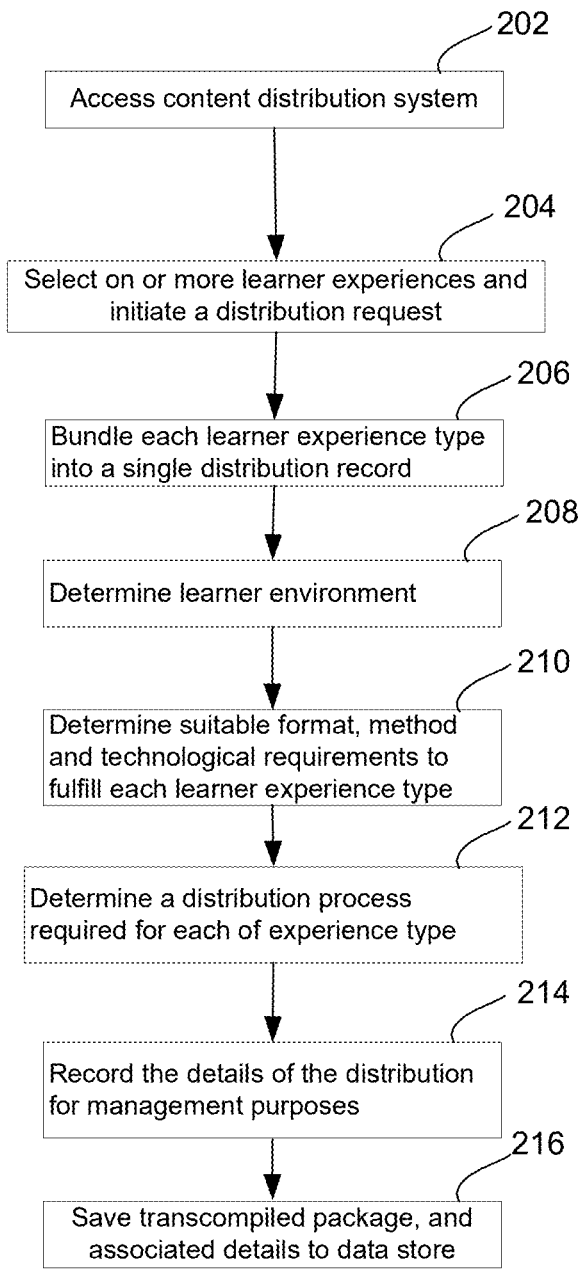
FIG. 4 shows a flow chart with example steps for layering experiences to generate enhanced content from the created content for different learner experience types.

In more detail, example steps 202-216 will now be described with reference to FIG. 4, showing a flowchart 200 with the example steps 202-216.

In step 202, a tenant user accesses the content distribution system 46 within the tenant SaaS application 26 to initiate a process to distribute the published courses in accordance with the desired learning experiences.

In step 204, the tenant user with the appropriate user permissions selects from one or more learner experience types, and initiates a distribution request. The learner experience types comprise a combination of the expected learner environments and the format or method of published files needed, to bundle and execute on a content distribution of a published course. Each content distribution action undertaken is distinct and a published course can have multiple content distributions attached to it.

In step 206, when a distribution request is made, a tenant distribution compute service (TDC) is called to manage the request. The TDC processes each learner experience type selected in step 204 and bundles each of them into a single distribution activity record.

In step 208, the TDC looks up the learner environment to determine what is required to process the distribution, including but not limited to print, screen readers, learning management systems, mobile apps, and directly hosted web.

In step 210, the TDC then narrows down the format, method and technological requirements to fulfill an experience type selected in step 204. Examples include, but are not limited to: Print for PDF; Print for Braille; Screen Readers via media-less/text only HTML 5; LMSes via traditional learning technology interoperability standard packages such as SCORM/AICC/xAPI which contain full course materials (the industry standard method); LMSes via "remote lms packages" using a technique to use traditional learning technology interoperability standard packages such as SCORM/AICC/xAPI as a vehicle to distribute iFramed and learning tools interoperability (LTI) enabled content which remotely reference full course materials; LMSes via "remotely managed" content where the system builds and updates the iFramed and LTI enabled content dynamically using the LMS's APIs while maintaining ongoing and active management of the content centrally; and mobile apps or website experiences without a LMS via direct hosting of APIs, HTML5 and similar technologies.

In step 212, the TDC then determines the distribution process required for each of experience type and either makes available the appropriate package for manual distribution or automatically manages the connection and distribution of the materials. Examples include, but are not limited to: Print and Screen Reader environments which require a download and either printing or distributing of the digital files offline to learners; LMS packages which require a download of the package and manual upload into the respective LMS; LMS remotely managed content that utilize API connectivity details stored in the tenant environments database to build and distribute the course automatically in real-time; and directly hosted content that is also built and distributed through real-time automatic means.

In step 214, the TDC then records the details of the distribution for management purposes, including all relevant information on the connection and what was built out without user intervention. For manual distributions the system requires input from the tenant user distributing the experience detailing the scope of the distribution for "offline use" tracking details. All digital experiences that are centrally hosted are also setup at this stage to track ongoing learner event activity. This includes both automated distribution processes and the "Remote LMS Package" option which, while requiring an initial manual upload to the LMS, can track use once setup on the LMS that is hosting the package.

In step 216, once the content has been distributed, the content is managed via the content management application via either real-time content management of distributed courses via API updates or by downloading a new version and manually re-distributing the course materials to the destinations recorded in the distribution details step.

Figure 5:
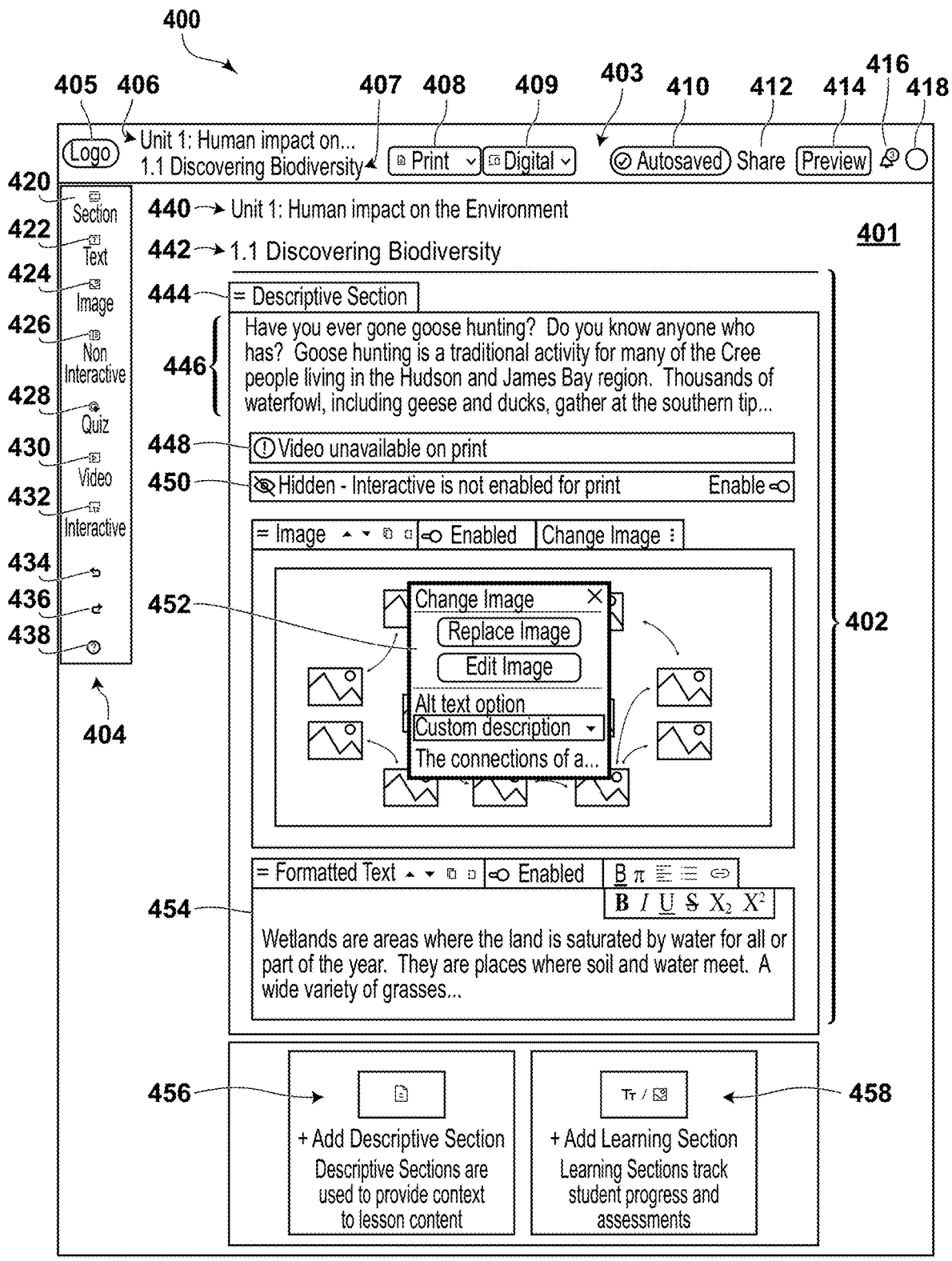
FIG. 5 shows an example user-interface for a print experience.

Looking at FIG. 5, an author is presented with a user-interface 400, such as example "Print view" of an authoring canvas 401 of the system 10. To elevate the importance of print-related experiences for authors, and therefore accessible-first and inclusive design principles, the authoring canvas 401 is designed with these two categories in mind.

The authoring area or canvas 401 comprises content 402, top bar 403 and components tool bar 404. The top bar 403 comprises the following tools or elements, or a subset or superset thereof: logo 405 associated with the tenant user, title 406 and/or subtitle 407 of the content 402, print view button 408 which allows the user to view a print version of the content 402, digital view button 409 which allows the user to view a digital version of the content 402, autosave notification 410, share button 412, preview button 414, notification component 416 and author identification 418. The components tool bar 404 comprises the following components or content elements, or a subset or superset thereof: section component 420, formatted text paragraph component 422, image component 424, non-interactive component 426, quiz component 428, video component 430, interactive component 432, undo icon 434, redo icon 436 and query icon 438.

Toggling between the print view button 408 and the digital view button 409 enables the tenant user to switch between a "Print view" and a "Digital view" of both the canvas 401 view and the availability of tools for adding and editing content 402 on the canvas 401. In order to minimize the amount of alternative content both views share the same content that is needed to produce a lesson that is flexible enough to support the wide range of experiences described above. Generally, the authoring process is initiated in the Print view, and therefore the expectation of starting with Print and building up to Digital is set immediately. This is further supported in all help and guideline user documentation for the system. The components tool bar 404 is used by authors to insert content elements 420-432 onto the canvas 401. These tools 420-432 are made available as appropriate to the authoring experience selected. As reflected in FIG. 5, when the print view button 408 is selected, the video component 430 and the interactive component 432 are disabled as the print experiences cannot play videos nor provide interactive experiences.

To write shared content effectively between print and digital views the author needs visibility at all times into what content is hidden from the active view but visible in the other views. The system treats this with a minimized height for components that are unavailable to the author. Components that do not have a current experience equivalency, such as the video component 430 in FIG. 5, are highlighted, in light red for example, and contain text indicating they are "unavailable". This treatment indicates to the author that the content likely represents a gap in learning experience in the current view that should be supplemented by the author.

Components that have a current experience equivalency, such as the interactive component 432 in FIG. 5, may be hidden or disabled from the current experience for reasons at the discretion of the author. This would typically be used to provide an alternative experience that is a more effective learning experience than the default equivalency provided by the component. These components when hidden are greyed out and contain text indicating that they are "hidden" and an "enable" toggle switch is set to the off state. Toggling the switch to the on state would restore the component to be visible.

This ability to hide and disable is available on all components 420-432 on the author canvas 401 that are available to that view, as indicated in FIG. 5 by the image component 424 and the formatted text paragraph component 422 "enabled" toggle switch being set to the "on" state. Note that the blue outlined sections in FIG. 5 represent the author's actively selected component to edit. In actual use only one blue outlined section exists at any given time, but both have been displayed in this context to provide visibility to the toggle's availability across components.

As shown in FIG. 5, the example content 402 within the authoring canvas 401 comprises a unit title 440, a title 442, a descriptive section 444 comprising an opening paragraph 446 that is shared between print and digital experiences. Videos and interactive content are present in digital experiences only, and therefore these components 448, 450 are disabled in the print only view; and images and formatted text paragraphs are present in print only experiences, therefore images components 452 and formatted text paragraphs components 454 are enabled. Additional descriptive sections may be added to content 402 by actuating "Add Descriptive Section" dialog box 456, and learning sections which track student progress and assessments may be added to content 402 by actuating "Add Learning Section" dialog box 458.

Figure 6:
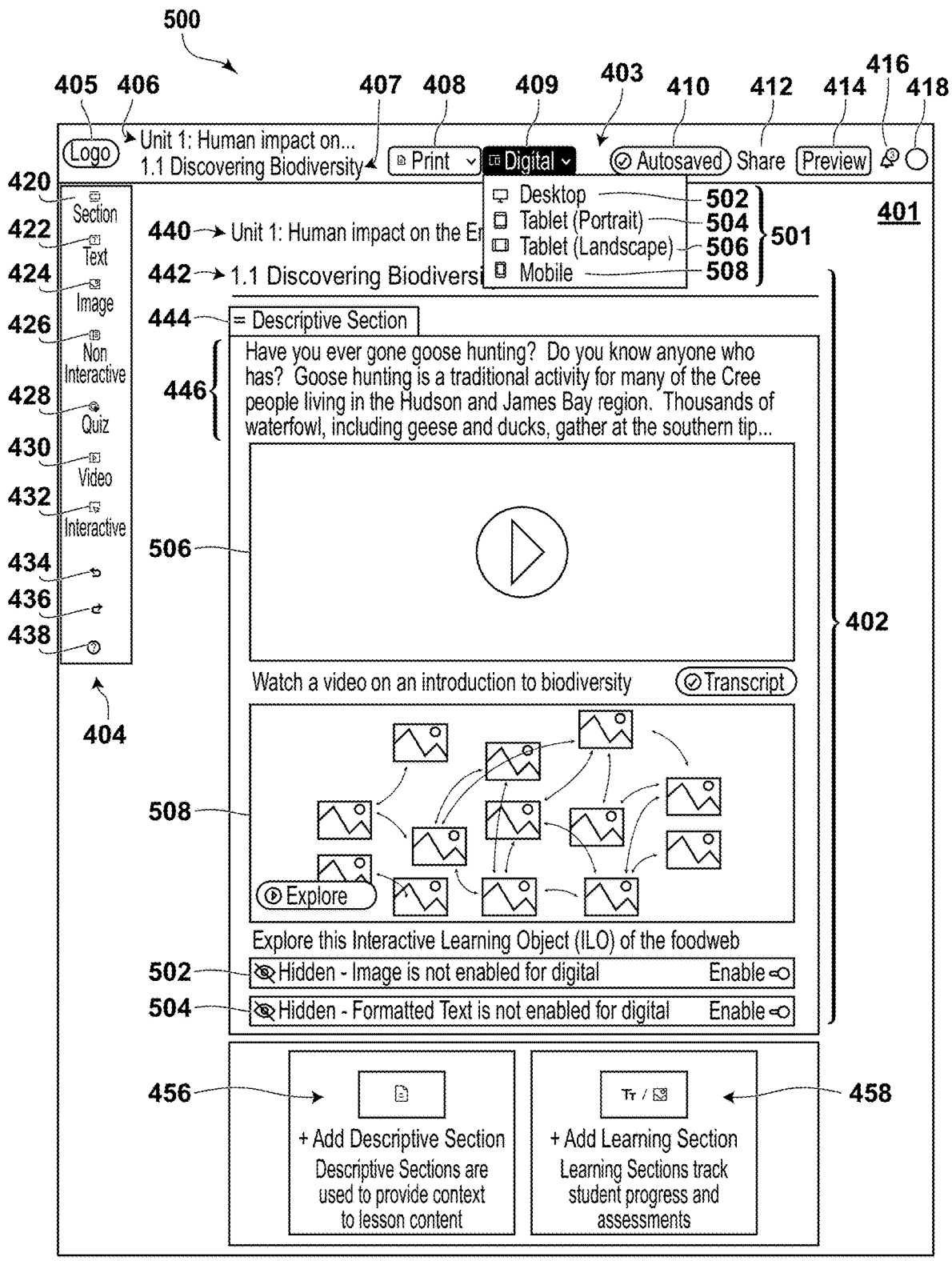
FIG. 6 shows an example user-interface for a digital experience.

Looking at FIG. 6, there is shown a user-interface 500, such as example "Digital view" of the authoring canvas 401 of system. User-interface 400 comprises authoring area or canvas 401 comprising content 402, a top bar 403 and components tool bar 404, as described previously. The digital view button 409 which allows the user to view a digital version of the content 402 comprises a drop-down menu 501 which allows the author to select from a plurality of devices based on screen size, such as desktop 502, tablet (portrait) 504, tablet (landscape) 506, and mobile 508. The components tool bar 404 comprises the following components or content elements, or a subset or superset thereof:

section component 420, formatted text paragraph component 422, image component 424, non-interactive component 426, quiz component 428, video component 430, interactive component 432, undo icon 434, redo icon 436 and query icon 438.

As can be seen under the digital view in FIG. 6, the video component 430 and the interactive component 432 are now enabled and editable and the formatted text paragraph component 504 and the image component 502 are now hidden and disabled. Accordingly, this indicates that the video 506 and interactive learning objects 508 are suitable replacements for the image and formatted text paragraph content, progressively enhancing the content for the digital learning experience without limiting the print experience's effectiveness in delivering its learning.

Within each Print and Digital experience views are sub-categories that tailor the authoring canvas 401 to address variations in their respective learning experiences when packaged and distributed. Initially the system supports a total of six sub-category views but this may be expanded to support additional experiences in the future.

On the digital side, as illustrated in FIG. 6, the system 10 supports four views, desktop 502, tablet (portrait) 504, tablet (landscape) 506, and mobile 508. The primary function of these views is to limit the authoring canvas 401 area to the limitations imposed by the screen sizes of these devices. By switching views authors can visualize the responsive design of the components on the canvas 401 and elect to provide alternative content as appropriate. This can range from simple adjustments like taller or wider versions of the same image being provided for different devices to more complicated treatments such as providing a completely different mobile optimizes experience for an interactive that was exclusively designed for larger screens. Additional descriptive sections may be added to content 402 by actuating "Add Descriptive Section" dialog box 456, and learning sections which track student progress and assessments may be added to content 402 by actuating "Add Learning Section" dialog box 458.

Figure 7:
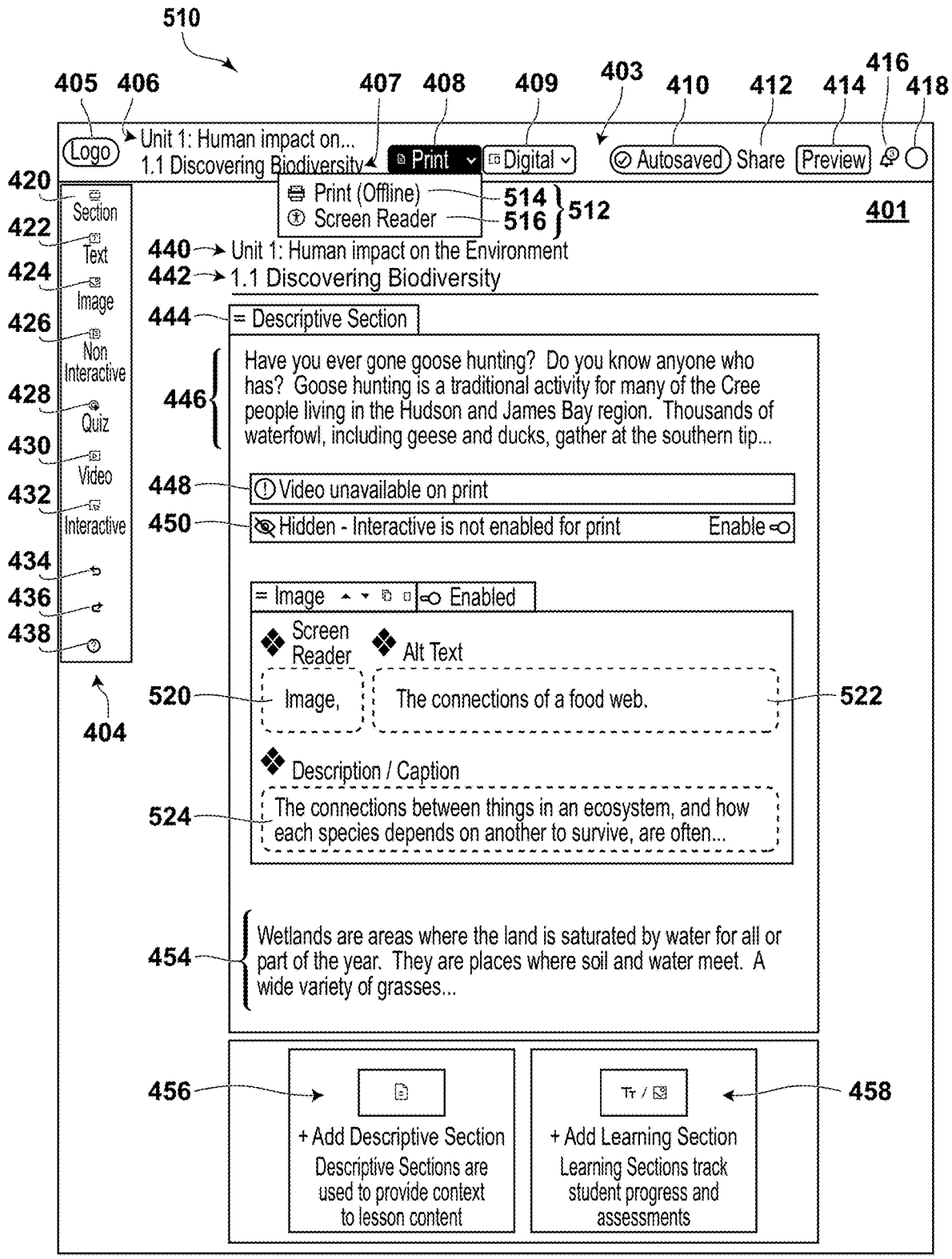
FIG. 7 shows an example user-interface for a print experience.

FIG. 7 shows a user-interface 510 for a Print experience. The Print view button 408 allows the user to view a print version of the content 402 and comprises a drop-down menu 512 which allows the author to select from between a Print (offline) version 514 for support of physical printing experiences and a screen reader version 516 for tailoring content for assistive devices. In keeping with the accessible-first and inclusive design focused features of the methods and system, the screen reader view 604 optimizes the editing experience to clearly express and allow for editing of the text representation typical of screen readers. In FIG. 7, user-interface 510 comprises authoring canvas 401 comprising a unit title 440, a title 442, a descriptive section 444 comprising an opening paragraph 446 that is shared between print and digital experiences. Videos and interactive content are present in digital experiences only, therefore videos component 448 and interactive content component 450 are greyed out in the print only view; and images component 452 and formatted text paragraphs component 454 are enabled. An image 520 may be added, including associated Alt text 522, and a description 524 of the image 608. Accordingly, in FIG. 7 all functional aspects of the canvas 401 are shared with the Print (offline) experience, however for visual content a change in the component layout is provided to replace them with: the text that is typically generated (spoken by) a screen reader when encountering this component. In this example screen readers will typically start by stating "Image" or "Graphic" 520 followed by a brief pause; the Alt text 522 that has been provided by the author, which typically immediately follows the screen reader generated text; and the caption or description 524 provided by the author, which typically immediately follows the Alt text 522. This significantly elevates the efficiency, accuracy, and understanding of the appropriate assistive device text content to include in the lesson as the author can visually read the expected screen reader's spoken experience as they edit.

Figure 8:
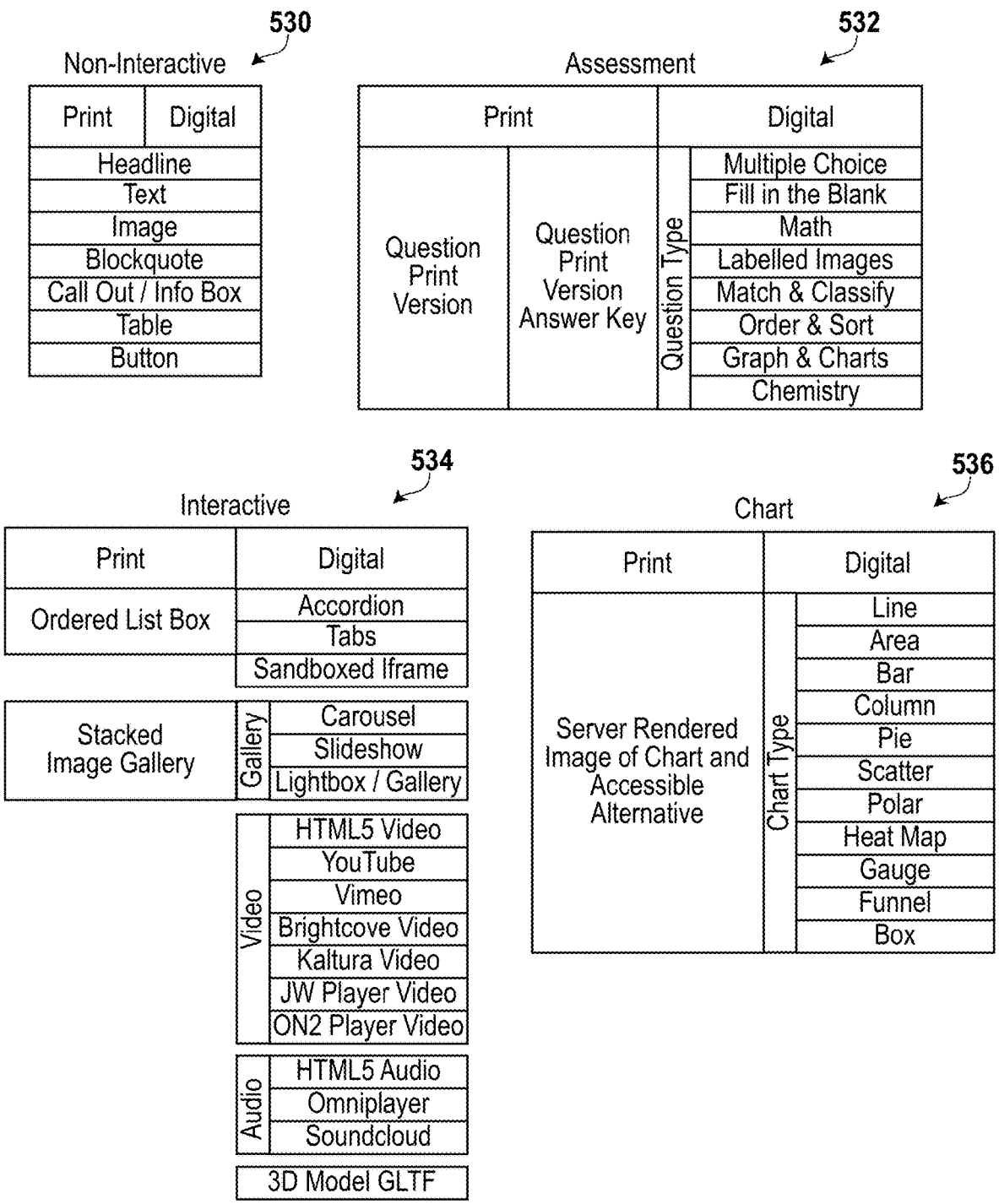
FIG. 8 shows print to digital considerations for components.

FIG. 8 shows print to digital considerations for components associated with various learner experiences. In view of the shared content across numerous authoring canvas 401 views, adaptability of components is fundamental to minimizing the volume of alternative content needed to enhance an accessible-first experience with digital interactivity. This is analogous to responsive design principles but extends the principles to incorporate adaptive principles. As shown in FIG. 8, all components of the system 10 are designed with explicit consideration for how the same headless content for said component can be displayed in print and digital learning experiences wherever feasible.

These components can be grouped into four categories, such as, non-interactive components 530, assessment components 532, interactive components 534, and chart components 536.

Non-interactive components 530 are fully supportive of both print and digital experiences and do not need material changes outside of responsive design considerations for digital devices.

Assessment components 532 are fully interactive in their digital experience but contain the content to provide an equivalent print experience. Print experiences however will need to separate the questions from the answers for an entire quiz to effectively deliver on the equivalent learning experience.

Interactive components 534 are fully interactive in their digital experience, some of which contain content to provide an equivalent print experience and some of which do not. For those experiences that have print experience equivalencies there is an added benefit of interchangeability of the digital experience, such as ordered lists in print that can be rendered as either accordions or tabs digitally, and stacked images in print that can be rendered as carousel, slideshow, or lightbox experiences digitally. As this list illustrates, it is a small subset of the total components (iframe, video, audio, and 3D) that cannot work for both print-based and digital-based learning experiences and therefore need alternative content to be fully accessible-first and supportive of inclusive design principles.

Chart components 536 are fully interactive in their digital experience but contain the content to provide an equivalent print experience. Print experiences however will need to render an image of the chart, any necessary data that would have displayed interactively, alternate text, and appropriate captioning and descriptions to effectively deliver on the equivalent learning experience.

Figure 9:
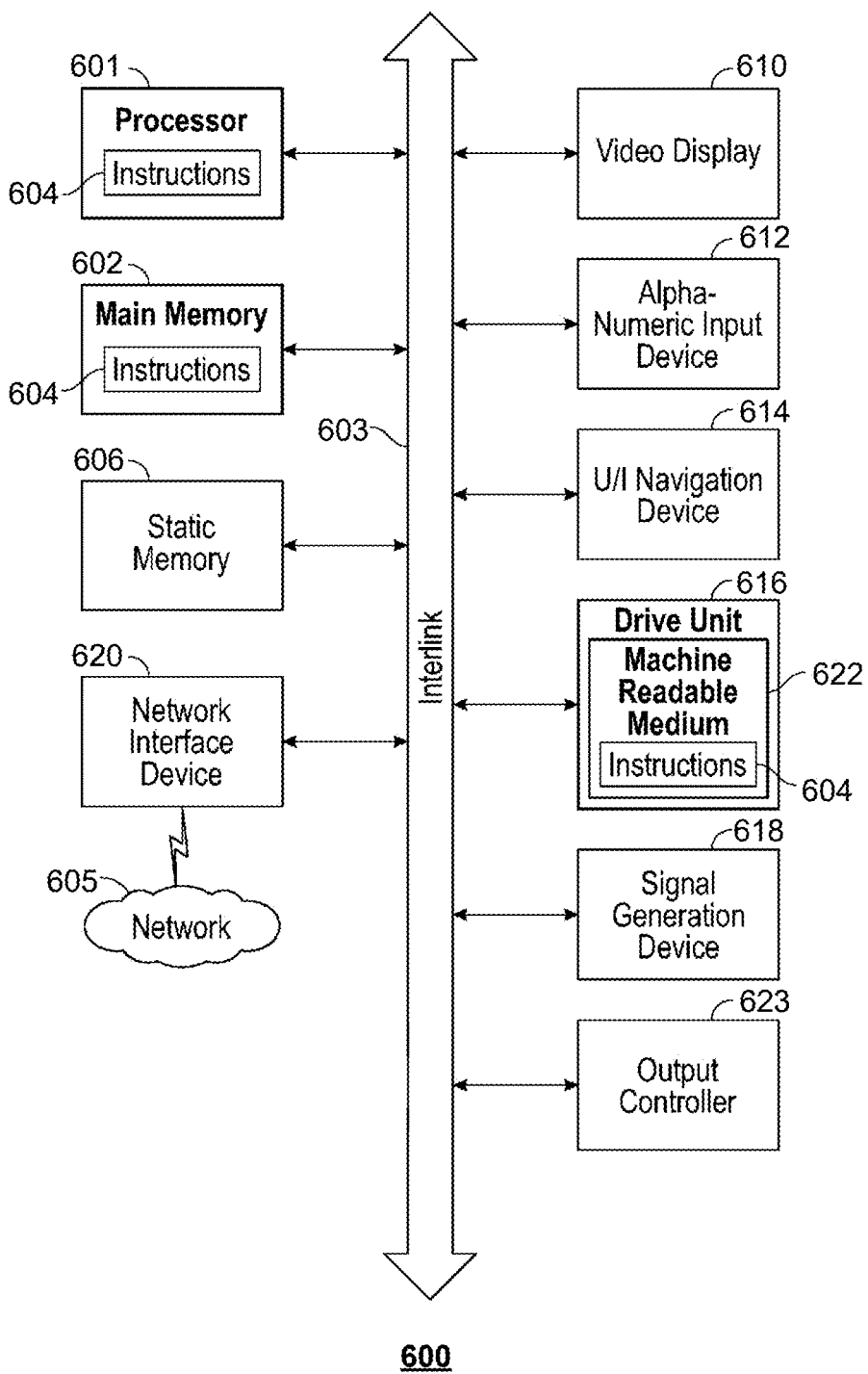
FIG. 9 illustrates a block diagram of an example of a machine upon which any one or more of the techniques (e.g., methodologies) discussed herein can be performed.

FIG. 9 illustrates a block diagram of an example machine 600, such as client device 21 or server computer 30, upon which any one or more of the techniques (e.g., methodologies) discussed herein may be performed. Machine 600 (e.g., computer system) may include a hardware processor 601 (e.g., a central processing unit (CPU), a graphics processing unit (GPU), a hardware processor core, or any combination thereof), a main memory 602 and a static memory 606, connected via an interlink 603 (e.g., link or bus), as some or all of these components may constitute hardware for systems or related implementations discussed above.

Generally, the hardware processor 601 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof. A processor circuit may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. A processor circuit may be emulated in software, running on a physical processor, as a virtual processor or virtual circuit. The virtual processor may behave like an independent processor but is implemented in software rather than hardware.

Specific examples of main memory 602 include Random Access Memory (RAM), and semiconductor memory devices, which may include storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; or optical media such as CD-ROM and DVD-ROM disks.

The machine 21, 30 may further include a display device 610, an input device 612 (e.g., a keyboard), and a user interface (UI) navigation device 614 (e.g., a mouse). In an example, the display device 610, input device 612, and UI navigation device 614 may be a touch-screen display. The machine 21, 30 may include a mass storage device 616 (e.g., drive unit), a signal generation device 618 (e.g., a speaker), a network interface device 620. The machine 21, 30 may include an output controller 723, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 616 may comprise a machine-readable medium 622 on which is stored one or more sets of data structures or instructions 604 (e.g., software) embodying or utilized by any one or more of the techniques or functions described herein. The instructions 604 may also reside, completely or at least partially, within the main memory 602, within static memory 606, or within the hardware processor 601 during execution thereof by the machine 21, 30. In an example, one or any combination of the hardware processor 601, the main memory 602, the static memory 606, or the mass storage device 616 comprises a machine readable medium.

Specific examples of machine-readable media include, one or more of non-volatile memory, such as semiconductor memory devices (e.g., EPROM or EEPROM) and flash memory devices; magnetic disks, such as internal hard disks and removable disks; magneto-optical disks; RAM; or optical media such as CD-ROM and DVD-ROM disks. While the machine-readable medium is illustrated as a single medium, the term "machine readable medium" may include a single medium or multiple media (e.g., a centralized or distributed database, or associated caches and servers) configured to store the one or more instructions 604.

The term "machine readable medium" includes, for example, any medium that is capable of storing, encoding, or carrying instructions for execution by the machine 21, 30 and that cause the machine 21, 30 to perform any one or more of the techniques of the present disclosure or causes another apparatus or system to perform any one or more of the techniques, or that is capable of storing, encoding or carrying data structures used by or associated with such instructions. Non-limiting machine-readable medium examples include solid-state memories, optical media, or magnetic media. Specific examples of machine-readable media include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); or optical media such as CD-ROM and DVD-ROM disks. In some examples, machine readable media includes non-transitory machine-readable media. In some examples, machine readable media includes machine readable media that is not a transitory propagating signal.

The instructions 604 may be transmitted or received, for example, over a communications network 605 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, a Long Term Evolution (LTE) 4G or 5G family of standards, a Universal Mobile Telecommunications System (UMTS) family of standards, peer-to-peer (P2P) networks, satellite communication networks, among others.

In an example, the network interface device 620 includes one or more physical jacks (e.g., Ethernet, coaxial, or other interconnection) or one or more antennas to access the communications network 605. In an example, the network interface device 620 includes one or more antennas to wirelessly communicate using at least one of single-input multiple-output (SIMO), multiple-input multiple-output (MIMO), or multiple-input single-output (MISO) techniques. In some examples, the network interface device 620 wirelessly communicates using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, can include, or can operate on, logic or a number of components, modules, or mechanisms (all referred to hereinafter as "modules"). Modules are tangible entities (e.g., hardware) capable of performing specified operations and is configured or arranged in a certain manner. In an example, circuits are arranged (e.g., internally or with respect to external entities such as other circuits) in a specified manner as a module. In an example, the whole or part of one or more computer systems (e.g., a standalone, client or server computer system) or one or more hardware processors are configured by firmware or software (e.g., instructions, an application portion, or an application) as a module that operates to perform specified operations. In an example, the software can reside on a non-transitory computer readable storage medium or other machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor is configured as respective different modules at different times. Software can accordingly configure a hardware processor, for example, to constitute a particular module at one instance of time and to constitute a different module at a different instance of time.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a GPU, an FPGA, or an ASIC.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system 20 can be interconnected by any form or medium of wireline and/or wireless digital data communication, e.g., a communications network 605.

VARIOUS NOTES

Each of the non-limiting aspects in this document can stand on its own or can be combined in various permutations or combinations with one or more of the other aspects or other subject matter described in this document.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc., are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Such instructions can be read and executed by one or more processors to enable performance of operations comprising a method, for example. The instructions are in any suitable form, such as but not limited to source code, compiled code, interpreted code, executable code, static code, dynamic code, and the like.

Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A system for generating content for presentation on a first end-user device and at least one second end-user device, the system comprising:
   at least one memory device configured for storing instructions; and
   at least one processor coupled to the at least one memory device and configured to execute the instructions to at least:
   generate the content;
   store the content in a headless format in which the content and an output format for presentation are separated, and wherein details of the content are stored on the the at least one memory device as metadata;
   generate a first content output comprising a first set of content layers in accordance with the metadata, wherein the first content output comprises a first content output format responsive to the first end-user device characteristics, wherein the first end-user device comprises minimal resources and/or specifications and the first content output format is direct towards an accessibility-first learning experience; and
   generate at least one second content output comprising the first set of content layers and at least one second set of content layers in accordance with the metadata, wherein the at least one second content output comprises at least one second content output format responsive to the at least one second end-user device characteristics, wherein the at least one second end-user device comprises non-minimal resources and/or specifications.

2. The system of claim 1, wherein the at least second set of content layers comprises at least one of data layers, multimedia layers, and interactive layers.

3. The system of claim 1, wherein the second set of layers are added in accordance with a desired learning experience and a desired user experience.

4. The system of claim 1, wherein the instructions comprise at least one set of instructions for authoring content for at least one of print and digital and digital only experiences comprising interactive learning objects (ILOs).

5. The system of claim 4, wherein the instructions further comprise at least one set of instructions for collaboration among users via visualizing and managing shared manipulation of content asynchronously or synchronously as the content is created and reviewed, and wherein the content comprises course materials and/or articles.

6. The system of claim 5, wherein the collaboration comprises at least one of visibility of simultaneous user activity, commenting, and review process sharing and management.

7. The system of claim 1, wherein the instructions comprise at least one set of instructions for content management comprising creating, editing, and managing the lessons and supplementary materials for each course package.

8. The system of claim 1, wherein the instructions comprise at least one set of instructions for content distribution comprising creating, editing, and managing the distribution of materials to the first user device and the at least second user device.

9. The system of claim 1, wherein the instructions comprise at least one set of instructions for content lifecycle management comprising a reporting engine for data related reporting functions of an application, comprising at least one of systems usage and performance, distribution tracking, learner progression, class progression; notification services for managing user and system notifications both within and outside of the application; managing application updates automated or otherwise; managing users, permissions, and groups and for turning on and off features and settings from the system; and managing security.

10. The system of claim 1, wherein the instructions comprise at least one set of instructions for export management comprising transcompiling courses and articles in accordance with format, styling, and output requirements for a desired learning experience, wherein the content is exported for publication in a plurality of formats to address variable learning formats suitable for accessibility-first learning experiences.

11. The system of claim 10, wherein the output requirements comprise at least one of a PDF format, an accessible-first HTML version of a course; an offline version of the course with full digital interactivity; a learning management systems (LMS) package; a remotely managed LMS package; and a directly hosted package.

12. The system of claim 1, wherein the instructions comprise at least one set of instructions for application management module comprising managing tenant account-related functions comprising at least one of billing, knowledge base, technical support, account management, third party integrations, theming, licensing, and shared service subscriptions, and permissions.

13. The system of claim 1, wherein the instructions comprise at least one set of instructions for media management module comprising handling uploading, editing, and metadata of media assets.

14. The system of claim 1, wherein the instructions comprise at least one set of instructions for course packaging and distribution of the content materials.

15. The system of claim 1, wherein the instructions comprise at least one set of instructions for transferring data and content between a content data store and requesting services via an API module.

16. A method for generating content for presentation on a first user device and a second user device, with a processor coupled to at least one memory device storing instructions, wherein the processor executes the instructions to at least perform the operations of:
  generating content;
  storing the content in a headless format in which the content and an output format for presentation are separated, and wherein details of the content are stored on the the at least one memory device as metadata;
  generating a first content output comprising a first set of content layers in accordance with the metadata, wherein the first content output comprises a first content output format responsive to the first end-user device characteristics, wherein the first end-user device comprises minimal resources and/or specifications and the first content output format is direct towards an accessibility-first learning experience; and
  generating at least one second content output comprising the first set of content layers and at least one second set of content layers in accordance with the metadata, wherein the at least one second content output comprises at least one second content output format responsive to at least one second end-user device characteristics, wherein the at least one second end-user device comprises non-minimal resources and/or specifications.

17. A computer readable medium storing instructions executable by a processor to carry out the operations comprising:
  generating content;
  storing the content in a headless format in which the content and an output format for presentation are separated, and wherein details of the content are stored on the the at least one memory device as metadata;
  generating a first content output comprising a first set of content layers in accordance with the metadata, wherein the first content output comprises a first content output format responsive to the first end-user device characteristics, wherein the first end-user device comprises minimal resources and/or specifications and the first content output format is direct towards an accessibility-first learning experience; and
  generating at least one second content output comprising the first set of content layers and at least one second set of content layers in accordance with the metadata, wherein the at least one second content output comprises at least one second content output format responsive to at least one second end-user device characteristics, wherein the at least one second end-user device comprises non-minimal resources and/or specifications.

* * * * *